United States Patent
Ruybal et al.

(10) Patent No.: US 11,420,612 B2
(45) Date of Patent: Aug. 23, 2022

(54) SYSTEMS AND METHODS FOR HYBRID VEHICLE ENGINE AND MOTOR TORQUE COORDINATION

(71) Applicant: Ford Global Technologies, LLC, Dearborn, MI (US)

(72) Inventors: Kevin Ruybal, Canton, MI (US); Jason Meyer, Canton, MI (US); Rajit Johri, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 482 days.

(21) Appl. No.: 16/414,656

(22) Filed: May 16, 2019

(65) Prior Publication Data

US 2020/0361441 A1   Nov. 19, 2020

(51) Int. Cl.
| | |
|---|---|
| *B60L 9/00* | (2019.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2019.01) |
| *B60W 20/10* | (2016.01) |
| *B60W 10/06* | (2006.01) |
| *B60W 10/08* | (2006.01) |
| *B60K 6/26* | (2007.10) |
| *F02P 5/15* | (2006.01) |
| *F02D 41/30* | (2006.01) |

(52) U.S. Cl.
CPC .............. *B60W 20/10* (2013.01); *B60K 6/26* (2013.01); *B60W 10/06* (2013.01); *B60W 10/08* (2013.01); *F02D 41/3058* (2013.01); *F02P 5/15* (2013.01); *B60W 2710/0616* (2013.01); *B60W 2710/0627* (2013.01); *B60W 2710/0666* (2013.01); *B60W 2710/083* (2013.01); *B60Y 2200/92* (2013.01); *B60Y 2400/432* (2013.01)

(58) Field of Classification Search
CPC ...... B60W 20/10; B60W 10/06; B60W 10/08; B60W 2710/0616; B60W 2710/0627; B60W 2710/0666; B60W 2710/083; B60K 6/26; F02D 41/3058; F02D 5/15; B60Y 2200/92; B60Y 2400/432
USPC .......................................................... 701/22
See application file for complete search history.

(56) References Cited

U.S. PATENT DOCUMENTS

| | | | |
|---|---|---|---|
| 8,696,514 B1 * | 4/2014 | Heap ...................... | B60K 6/445 477/3 |
| 2005/0252283 A1 | 11/2005 | Heap et al. | |
| 2009/0299602 A1 * | 12/2009 | Hartrey ............... | F02D 41/1497 701/102 |
| 2010/0038158 A1 * | 2/2010 | Whitney ............... | B60W 30/16 180/65.265 |

(Continued)

*Primary Examiner* — Mahmoud S Ismail
(74) *Attorney, Agent, or Firm* — David Kelley; McCoy Russell LLP

(57) ABSTRACT

Methods and systems are provided for coordinating engine and motor torque in a hybrid vehicle system. The systems and methods use an engine torque command to obtain a motor torque command, and adjust the engine torque command based on an estimate of a time delay between commanded and actual motor torque prior to the engine command being sent to an engine controller. In this way, crankshaft torque accuracy may be improved.

10 Claims, 10 Drawing Sheets

(56) References Cited

U.S. PATENT DOCUMENTS

| | | | |
|---|---|---|---|
| 2012/0309585 A1* | 12/2012 | Whitney | B60K 6/48 477/5 |
| 2013/0151044 A1 | 6/2013 | Lee | |
| 2017/0225670 A1* | 8/2017 | Johri | B60W 10/02 |
| 2020/0049229 A1* | 2/2020 | Mizuguchi | B60K 6/38 |

* cited by examiner

SYSTEMS AND METHODS FOR HYBRID VEHICLE ENGINE AND MOTOR TORQUE COORDINATION

FIELD

The present description relates generally to methods and systems for coordinating engine and motor capabilities.

BACKGROUND/SUMMARY

Hybrid vehicles that include at least one or more motors upstream of a transmission may include control strategy to coordinate torque from an engine with torque from a motor to achieve a single, desired crankshaft output torque. Special consideration of the general behavior of each of the motor and engine may be taken during coordination to ensure that the total system works well together. For example, spark ignition internal combustion engines running at the optimal spark advance (referred to as maximum brake torque, or MBT) are able to almost instantly decrease torque by retarding the ignition timing for the next combustion event; however, an engine is not capable of producing a relatively large amount of negative torque. An engine at MBT is also relatively slow to increase torque, as there is a time delay for intake manifold pressure to increase following changes in throttle angle, supercharger/turbocharger actuation, camshaft angle changes, etc.

Electric motors, on the other hand, can accurately and predictably produce the commanded amount of torque in both increasing and decreasing directions. However, such motors are not able to respond instantaneously to a step change in demand torque. Rather, a motor exhibits a response having a time constant when generating a requested torque due to the time to generate the electromagnetic field within the motor and the mass of the motor's armature. Additionally, a communications delay between a controller and an inverter that supplies electric current to the motor may be present. The communications delay may further influence when torque is produced via the motor. Finally, the electric motor may receive power from a battery, which is a finite resource that may not be available for extended periods of time.

Accordingly, any control methodology that commands motor torque as a function of feedback of a measured engine output torque in response to changes in crankshaft torque requests suffers from the fact that the inherent delay in delivering motor torque can reduce accuracy of the crankshaft torque response. Specifically, due to the inherent delay in delivering motor torque, such control methodology may result in actual crankshaft torque overshooting requested crankshaft torque in either a negative or positive direction, in response to requested reductions in crankshaft torque and increases in crankshaft torque, respectively.

Toward this end, United States Patent Application No. 2017/0225670 discloses compensating for a communications time delay between a first controller requesting motor torque and a second controller that controls motor torque, to improve driveline torque estimation thus enabling motor torque and engine torque delivery to more effectively meet a desired driveline torque. However, the inventors have recognized potential issues with such a method. Specifically, the disclosure of United States Patent Application No. 2017/0225670 does not provide for a way in which to modify an engine torque command as a function of motor torque delay prior to the motor torque command and engine torque commands being sent to their respective controllers. Accordingly, for rapid changes in crankshaft torque request, the disclosed methodology for compensating motor torque delay may not be able to prevent actual crankshaft torque overshooting desired crankshaft torque.

Thus, the inventors herein have developed systems and methods to at least partially address the above-mentioned issues. In one example, a driveline operating method comprises controlling a motor and an engine via commanding a motor torque in response to an engine torque command and a requested motor torque, and commanding an engine torque in response to a requested engine torque and output of a motor torque model. In this way, inherent delays in the motor producing the commanded motor torque may be compensated for by the engine, without relying on actual engine feedback for the compensation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
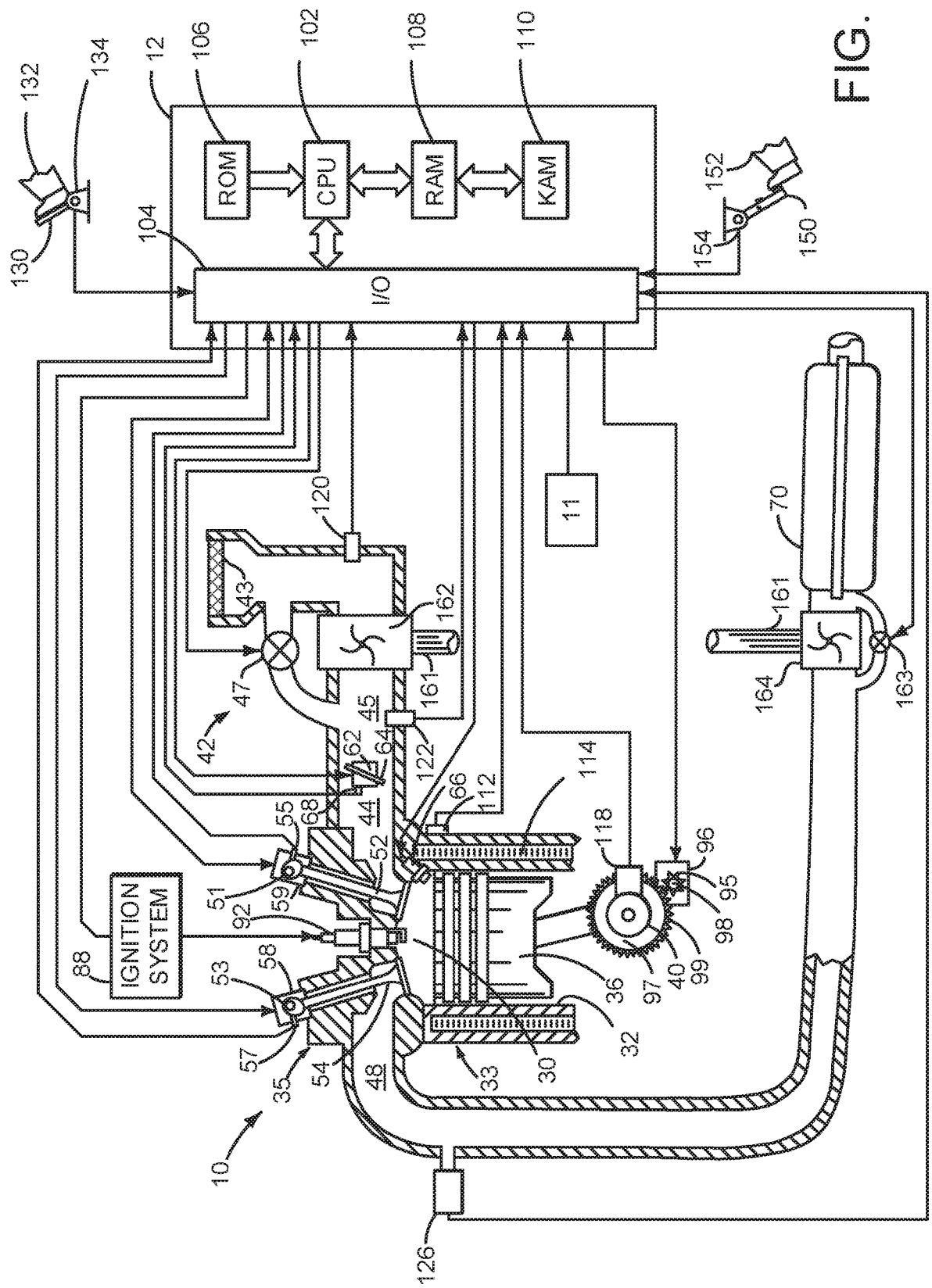
FIG. 1 is a schematic diagram of an engine.
Figure 2:
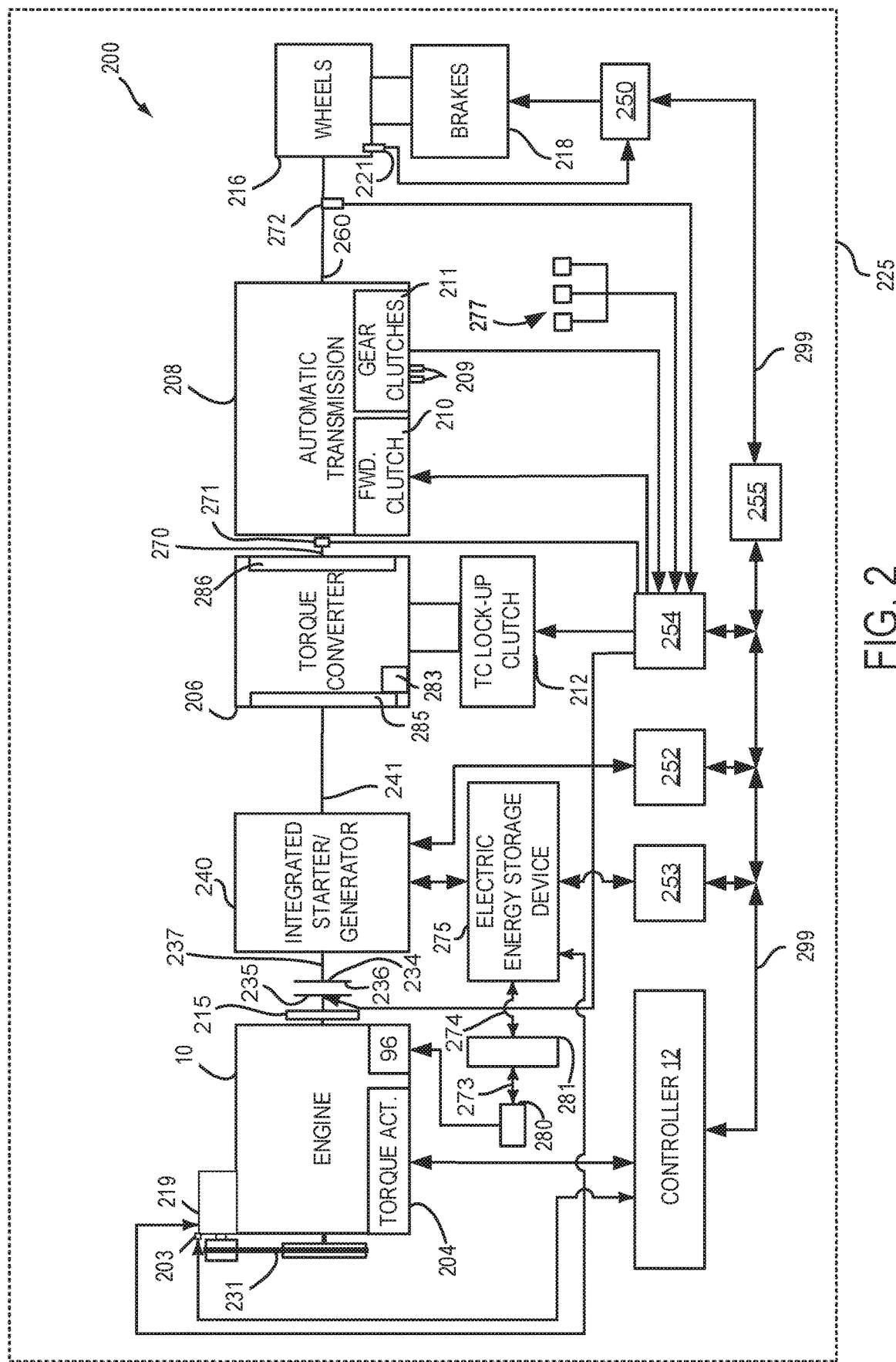
FIG. 2 is a schematic diagram of a hybrid vehicle driveline.
Figure 3:
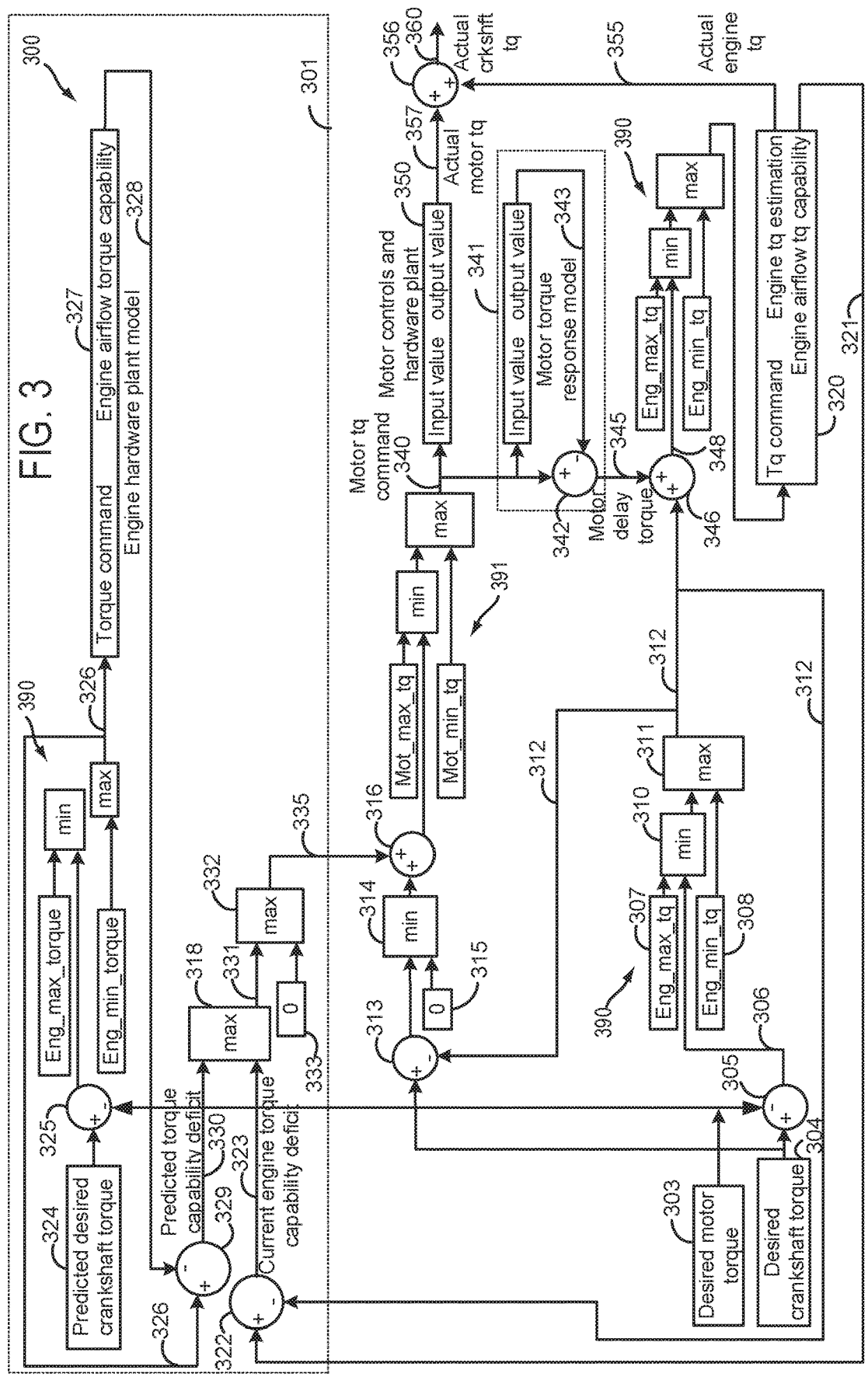
FIG. 3 depicts an example of a torque control operating sequence.
Figure 4:
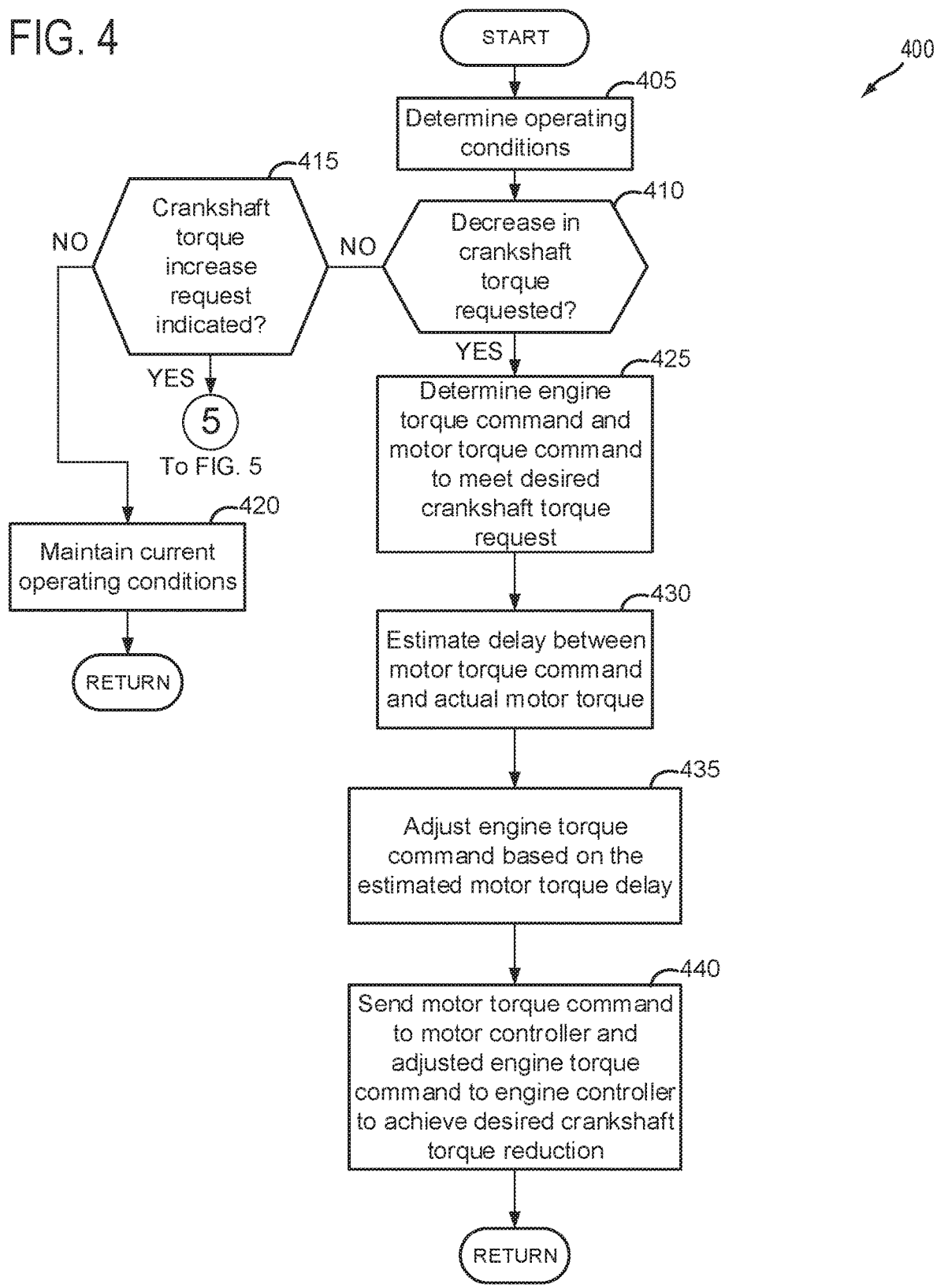
FIGS. 4-5 depict example methods for coordinating engine and motor torque.
Figure 5:
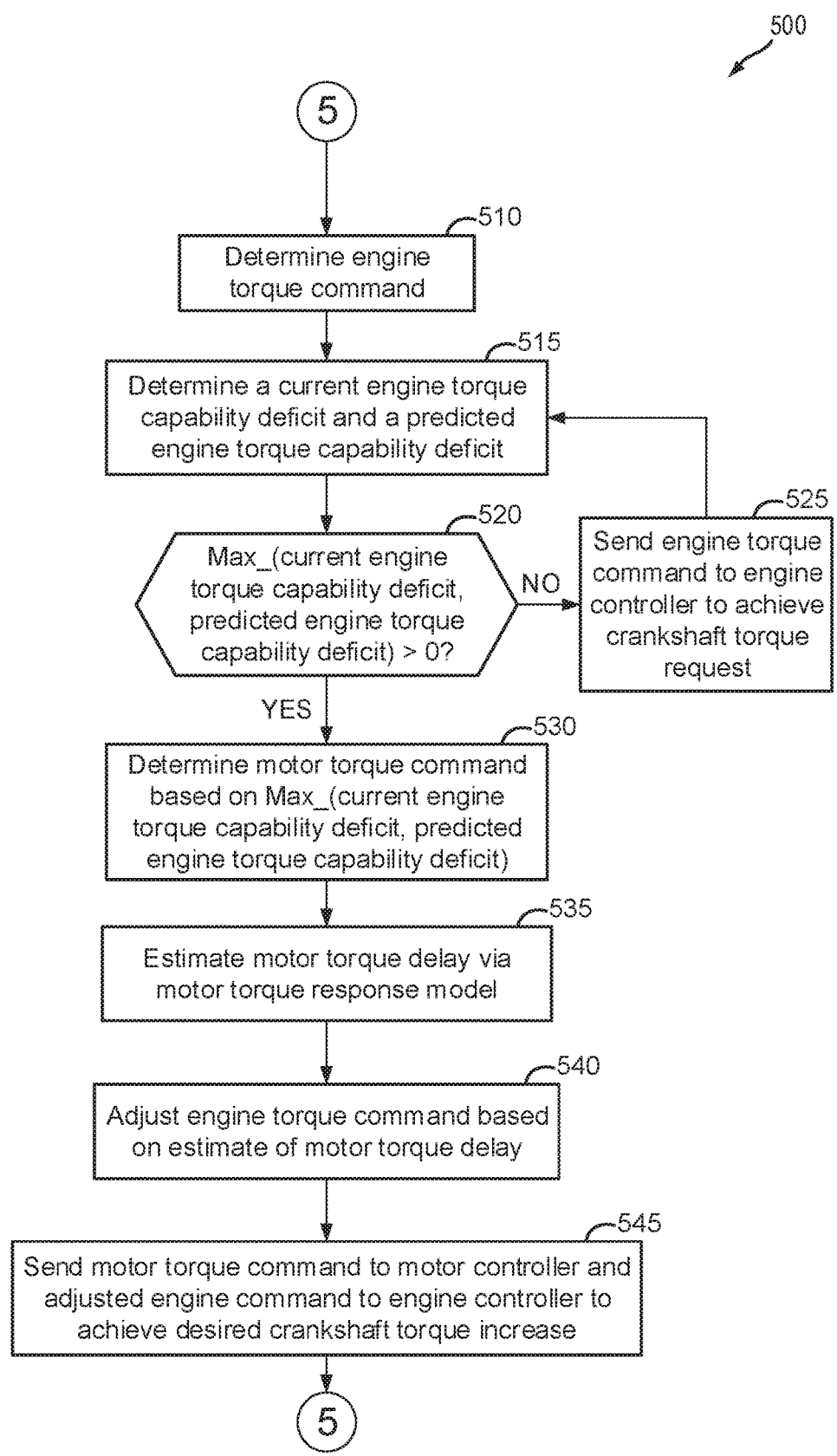
Figure 6:
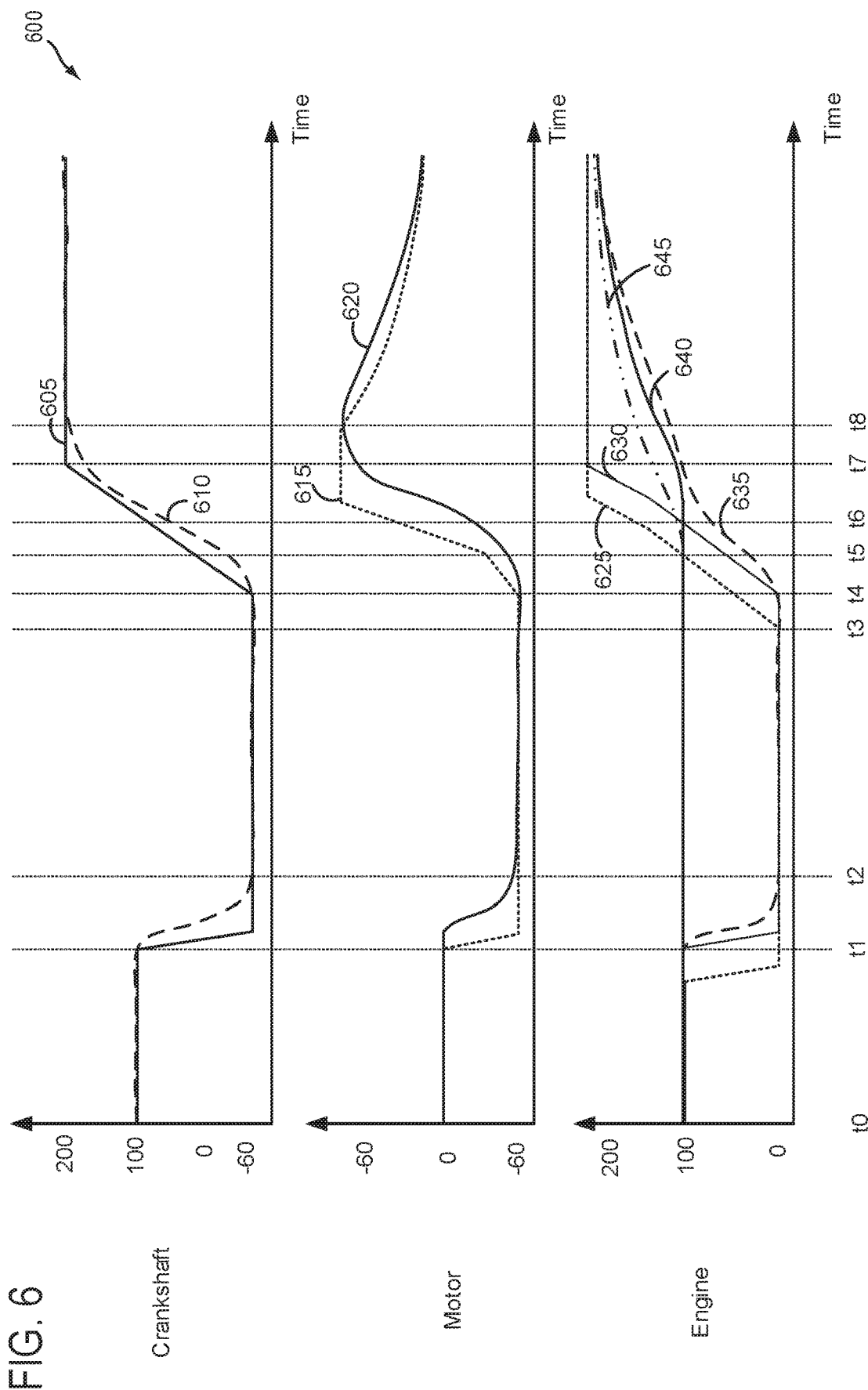
FIG. 6 depicts an example timeline for coordinating engine and motor torque according to the methods of FIGS. 4-5.
Figure 7A:
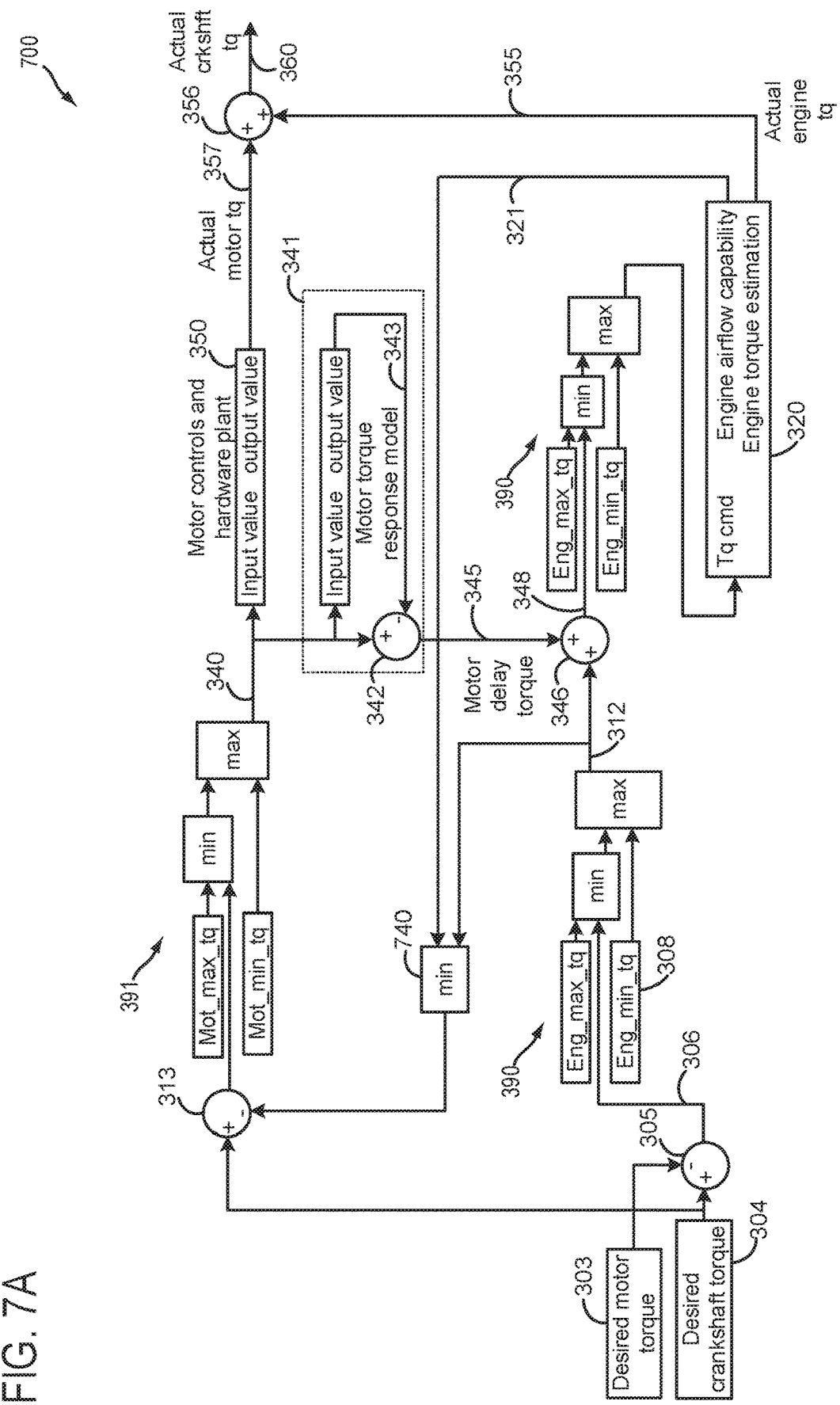
FIGS. 7A-7B depict other examples of torque control operating sequences.
Figure 7B:
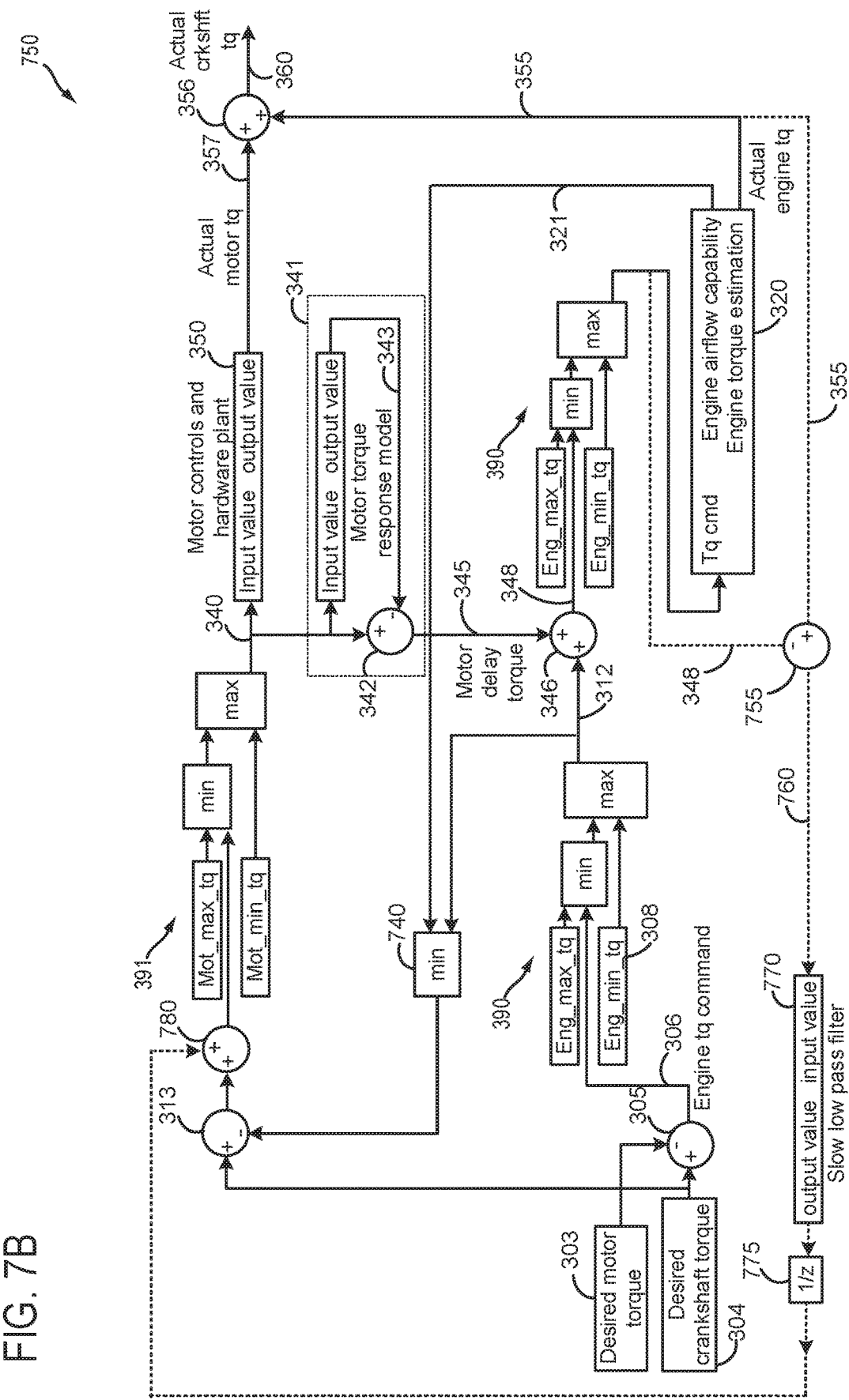
Figure 8:
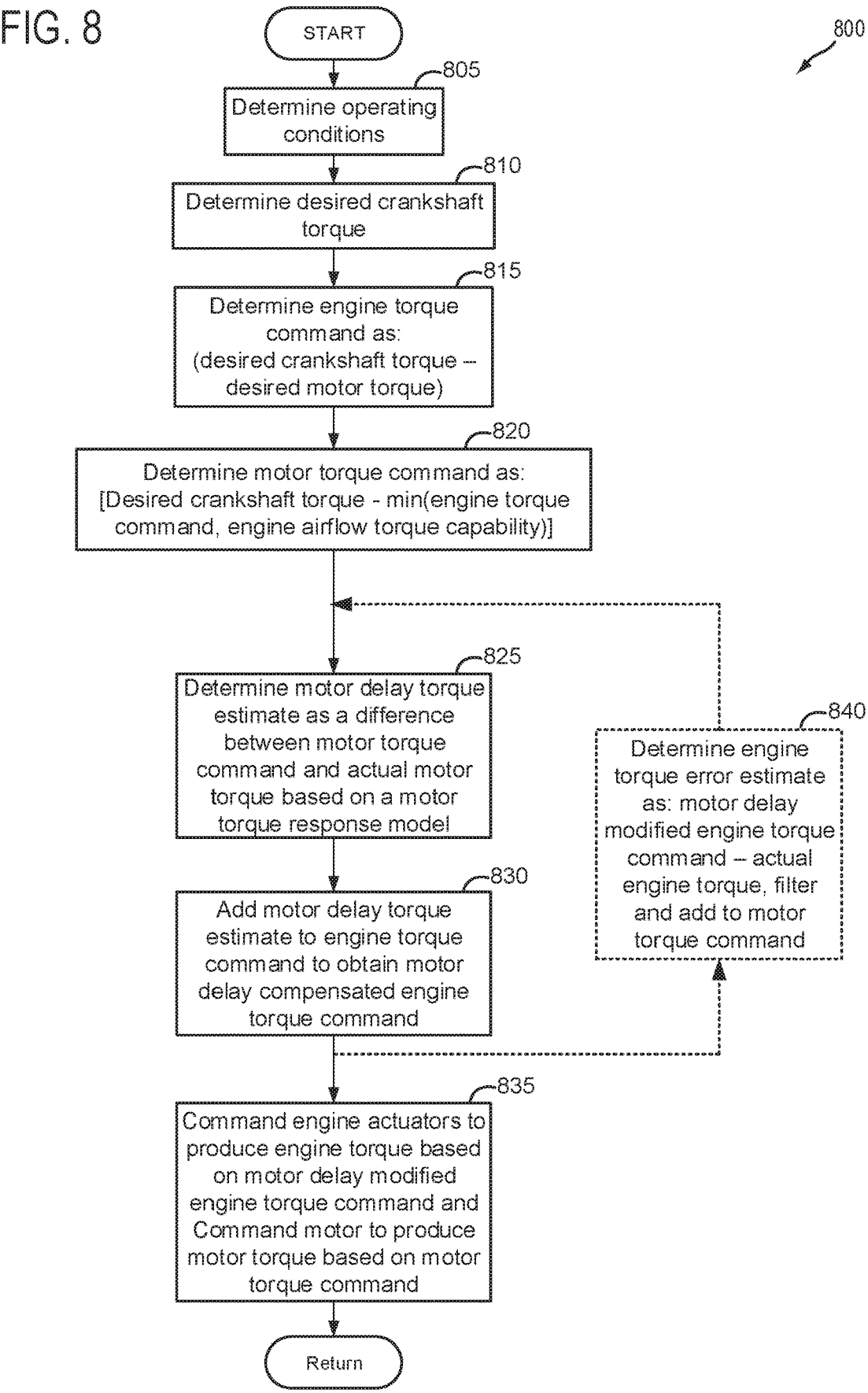
FIG. 8 depicts another example method for coordinating engine and motor torque.
Figure 9:
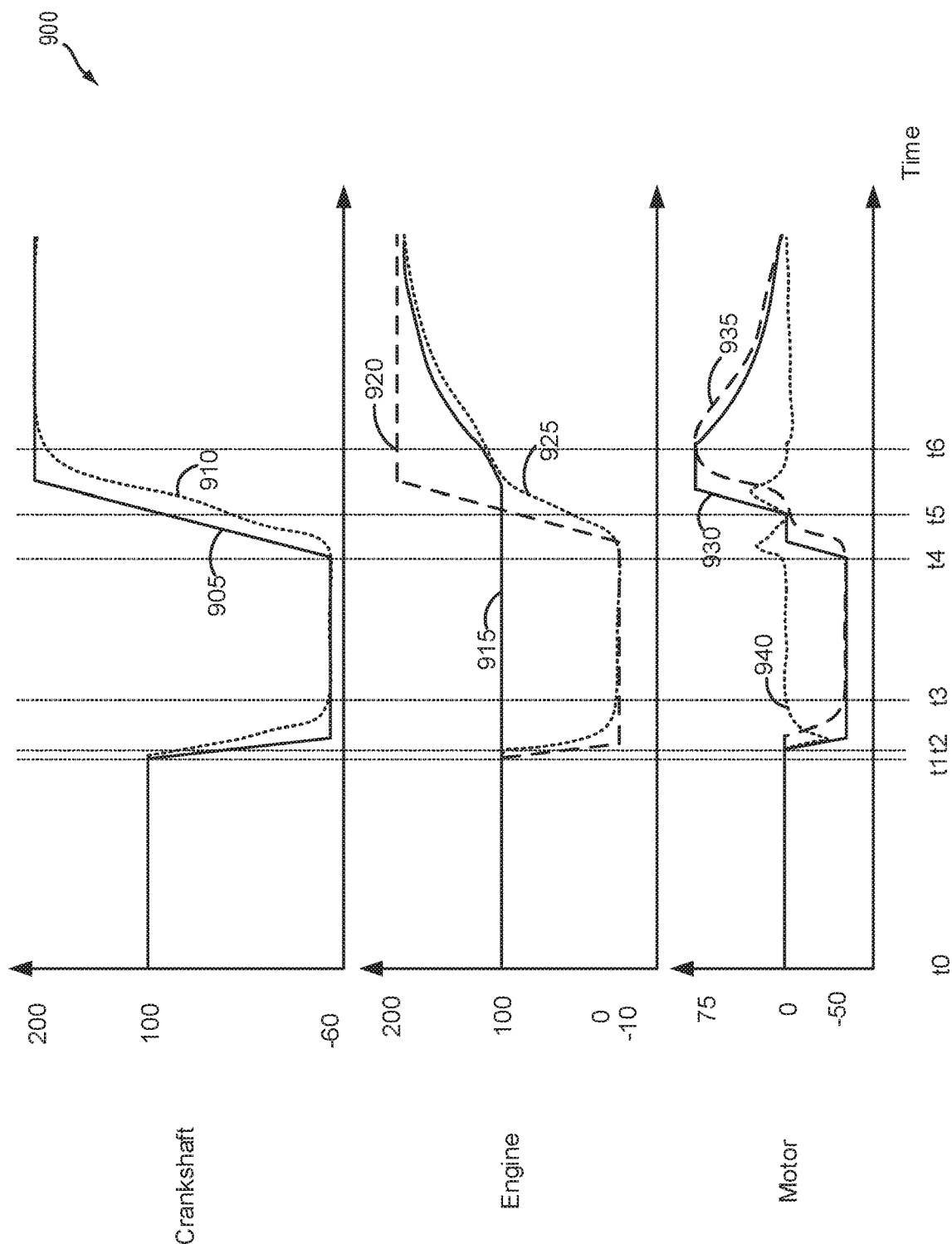
FIG. 9 depicts an example timeline for coordinating engine and motor torque using the method of FIG. 8.

The following description relates to systems and methods for coordinating engine and motor torque to improve crankshaft torque delivery accuracy, and accordingly, an engine system relevant to the present disclosure is depicted at FIG. 1, and a hybrid vehicle driveline relevant to the present disclosure is depicted at FIG. 2. An example control system for coordinating engine and motor torque that includes a predictive component for positive crankshaft torque requests is depicted at FIG. 3. FIGS. 4-5 depict example methods that are based on the control system of FIG. 3. An example timeline depicting how the methods of FIGS. 4-5 may be used to coordinate engine and motor torque is depicted at FIG. 6. FIG. 7A depicts another example control system for coordinating engine and motor torque that does not include the predictive component of the control system of FIG. 3. FIG. 7B depicts a modification to the control system of FIG. 7A that includes compensation for steady-state engine torque oscillation. An example method for coordinating engine and motor torque that is based on the control systems of FIGS. 7A-7B is depicted at FIG. 8. FIG. 9 depicts an example timeline illustrating how the method of FIG. 8 may be used to coordinate engine and motor torque.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-2 and employs the actuators shown in FIGS. 1-2 to adjust engine operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

While FIG. 1 depicts an example of a spark-ignition engine, it may be understood that the systems and methods discussed herein may additionally or alternatively apply to diesel engines, without departing from the scope of this disclosure.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, torque of engine 10 may be adjusted via torque actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vise-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output torque may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide torque to powertrain 200 or to convert powertrain torque into electrical energy to be stored in electric energy storage device 275 in a regeneration mode. ISG 240 is in electrical communication with energy storage device 275. ISG 240 has a higher output torque capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive torque or a negative torque to powertrain 200 via operating as a motor or generator as instructed by electric machine controller 252.

Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

While an automatic transmission is depicted, it may be understood that the systems and methods discussed herein may equally apply to powertrains configured with other transmissions, for example manual transmissions, dual-clutch transmissions, etc. Furthermore, while not explicitly illustrated, the systems and methods discussed herein may equally apply to vehicles that additionally include an electric machine coupled to the powertrain downstream of the transmission.

A frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates a fraction of the requested driver demand torque to the engine and the remaining fraction to the ISG or BISG. Vehicle system controller 255 requests the engine torque from engine controller 12 and the ISG torque from electric machine controller 252. If the ISG torque plus the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device 275, a charging torque (e.g., a negative ISG torque) may be requested while a non-zero driver demand torque is present. Vehicle system controller 255 may request increased engine torque to overcome the charging torque to meet the driver demand torque.

In response to a request to decelerate vehicle 225 and provide regenerative braking, vehicle system controller may provide a negative desired wheel torque based on vehicle speed and brake pedal position. Vehicle system controller 255 then allocates a fraction of the negative desired wheel torque to the ISG 240 (e.g., desired powertrain wheel torque) and the remaining fraction to friction brakes 218 (e.g., desired friction brake wheel torque). Further, vehicle system controller may notify transmission controller 254 that the vehicle is in regenerative braking mode so that transmission controller 254 shifts gears 211 based on a unique shifting schedule to increase regeneration efficiency. ISG 240 supplies a negative torque to transmission input shaft 270, but negative torque provided by ISG 240 may be limited by transmission controller 254 which outputs a transmission input shaft negative torque limit (e.g., not to be exceeded threshold value). Further, negative torque of ISG 240 may be limited (e.g., constrained to less than a threshold negative threshold torque) based on operating conditions of electric energy storage device 275, by vehicle system controller 255, or electric machine controller 252. Any portion of desired negative wheel torque that may not be provided by ISG 240 because of transmission or ISG limits may be allocated to friction brakes 218 so that the desired wheel torque is provided by a combination of negative wheel torque from friction brakes 218 and ISG 240.

Accordingly, torque control of the various powertrain components may be supervised by vehicle system controller 255 with local torque control for the engine 10, transmission 208, electric machine 240, and brakes 218 provided via engine controller 12, electric machine controller 252, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Electric machine controller 252 may control torque output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that negative ISG torque does not cause the wheel torque limit to be exceeded. For example, if controller 250 issues a negative wheel torque limit of 50 N-m, ISG torque is adjusted to provide less than 50 N-m (e.g., 49 N-m) of negative torque at the wheels, including compensating for transmission gearing.

Discussed herein, a system for a hybrid vehicle may comprise an engine and a motor/generator. The system may further include a controller with computer readable instructions stored on non-transitory memory that when executed cause the controller to determine a motor torque command based on an engine torque command that is in turn based on a desired crankshaft torque. The controller may store further instructions to send the motor command to a model that outputs an expected delay between the motor torque command and an actual motor torque. The controller may store further instructions to adjust the engine torque command based on the expected delay. The controller may store further instructions to, subsequent to adjusting the engine torque command, control an engine actuator based on the adjusted engine torque command and command a motor torque based on the motor torque command.

In such a system, the engine may be a diesel engine and the controller may store further instructions to control the engine actuator to reduce an amount of fuel injected to the engine.

In such a system, the engine may be a spark-ignition engine, and the controller may store further instructions to control the engine actuator to retard a timing of spark provided to the engine.

In such a system, the controller may store further instructions to determine an actual engine torque, filter the actual engine torque to remove engine torque oscillations to obtain a filtered actual engine torque, and add the filtered actual engine torque to the motor torque command.

As mentioned above, there may be some limitations to a control strategy that uses an electric motor to transiently fill in for engine torque errors. Specifically, there may be limitations to a strategy that includes determining a total desired crankshaft torque, commanding the desired crankshaft torque to the engine controller, which in turn commands engine actuators to achieve the commanded torque, and estimating actual engine torque in order to determine how much torque to command to the motor to make up the difference between the desired crankshaft torque and the actual engine torque. Discussed herein such a control strategy is referred to as "simple control strategy" or "simple strategy." Such a simple strategy satisfies a number of goals of a hybrid system, namely at least 1) that the engine delivers steady state power which conserves battery energy when the engine is running, 2) that the motor delivers large magnitude negative torque and quickly increasing positive torque that the engine cannot immediately deliver since such behavior will be visible as a difference between the engine torque command and instantly achieved engine torque feedback, and 3) that the motor will be automatically commanded to fill in unpredictable transient torque error between the engine and its command that may exist due to slow response due to cold temperature, aging components, etc.

However, the limitations for such control strategy include, in one example, that the motor torque command is directly coupled to the estimated engine torque, which may be incorrect, noisy and/or oscillatory. Thus, engine torque estimation or torque delivery errors may also affect the motor torque command and add additional torque noise and oscillation to the system. This may be a significant issue when the engine operates near the maximum engine torque limit. Powertrain limiting protection (PTLP) reduces the engine torque production and can cause the engine torque estimate to rapidly fluctuate, and the motor response to this may excite the driveline.

Another example limitation of the simple control strategy is that because the engine is always commanded to deliver the full torque request, prolonged motor charging/discharging or retarding ignition timing may be required to reduce torque for significant periods of time, which may make energy management more difficult (e.g. sustained charging/discharging) or reduce efficiency (e.g. spark reduction).

Yet another example limitation of the simple control strategy is that because the engine is first commanded to produce torque, and then the strategy has to wait for engine feedback before commanding torque to the motor through inverter system delays, the physical torque produced by the motor may not be aligned with the physical torque from the engine. During transient events with fast moving crankshaft torque targets, there may be significant misalignment of engine and motor physical torque that may cause errors between desired crankshaft torque and the actual torque achieved.

Still another limitation of the simple control strategy is that because the engine is always commanded as the primary actuator and the motor is commanded using engine feedback, there is no way to modify the engine torque command using the motor's torque command or feedback without creating circular logic (e.g. motor command based on engine torque with engine command based on motor torque).

Accordingly, discussed herein are control strategies that place more emphasis on the coordination of the engine and motor initially, and provide a way in which to compensate for motor torque delay, in order to improve efficiency and reduce or avoid the above-mentioned limitations of the simple control strategy.

One example control system is depicted at FIG. 3. Turning to FIG. 3, an example block diagram of control system 300 for compensating for communication delays in a driveline torque control system is shown. The control system of FIG. 3 may be incorporated as executable instructions stored in non-transitory memory of the system shown in FIGS. 1-2. Further, the block diagram may describe programming and devices in the physical world.

Control system 300 includes a predictive component 301 that is relied upon for determining a motor torque command for meeting a desired crankshaft torque request. Specifically, predictive component 301 may be used for positive crankshaft torque increase requests where there is a difference or deficit between an engine torque command to meet the crankshaft torque increase request and a current engine airflow torque capability. For spark-ignition engines, discussed herein the current engine airflow torque capability may be understood to comprise the current engine airflow torque capability at maximum brake torque, or MBT. For diesel engines, discussed herein the current engine airflow torque capability may be understood to comprise a current engine airflow torque capability at the engine's smoke limit, or a maximum fuel injection rate at which the engine still produces acceptable smoke emissions. For example, diesel engines are unthrottled, thus their airflow is a function of engine speed and turbocharger boost. Boost itself may be determined by diesel engine airflow and fuel injection rate. At a given operating point (e.g. specific engine speed and boost pressure), a diesel engine may increase torque by injecting more fuel, which may instantly produce more torque and which may also put more energy into the turbocharger to generate more airflow and torque capability. However, the amount of fuel that can be injected is limited by air-fuel ratio, as adding excessing amounts of fuel may increase the amount of smoke and emissions produced by the engine.

Alternatively, as will be elaborated in further detail below, in response to crankshaft torque reduction requests where desired crankshaft torque is below a capability of the engine to achieve the desired crankshaft torque, the predictive component 301 may not be relied upon for meeting the crankshaft torque reduction request, as will be elaborated in further detail below.

Block 304 comprises a desired crankshaft torque requested, for example via a vehicle operator pressing or releasing the accelerator pedal to some extent. Block 303 represents a desired motor torque. Block 303 may be used to dynamically allocate a portion of the desired crankshaft request to the motor, and may be referred to herein as a preset motor torque. Block 303 may be used as a tool, for example, during steady state conditions to allow the motor to be set to a negative value to charge the battery, or a positive value to discharge the battery and reduce fuel consumed by the engine. Further examples where desired motor torque may be useful will be discussed in further detail below.

A difference between block 303 and 304 obtained at subtraction junction 305 provides output 306. Block 310 outputs a minimum value between output 306 and block 307, which represents a maximum engine torque that the engine can produce at the current engine speed. Block 311 outputs a maximum value between the minimum value output from block 310 and block 308, which represents a minimum torque the engine could ever produce given an allowable torque reduction for current combustion stability, emissions, etc. The maximum value output from block 311 comprises engine torque command 312. For simplicity in terms of further discussion of control system 300, control strategy that includes blocks 307, 308, 310 and 311 may simply be referred to as engine torque limits 390. For example, it may be understood that output 306 is clipped by engine torque limits 390 to obtain engine torque command 312.

Subtraction junction 313 outputs a difference between desired crankshaft torque (block 304) and engine torque command 312. Block 314 outputs a minimum value between output from subtraction junction 313 and 0 (block 315). Accordingly, it may be understood that block 314 provides for compensation for situations where the engine torque command 312 is unable to meet the desired crankshaft torque request (block 304), specifically when the desired crankshaft torque request is below the negative ability of the engine to achieve the desired crankshaft torque request.

Output from block 314 is fed to summing junction 316. Summing junction 316 receives input from predictive component 301. As will be elaborated in further detail below, predictive component 301 calculates motor torque to compensate for a difference between the engine's maximum positive torque capability (current engine airflow torque capability at maximum brake torque for spark-ignition engines), and the engine torque commanded to the engine (e.g. 312). In other words, predictive component 301 may be used under circumstances where a positive increase in crankshaft torque is being requested, where the engine torque command exceeds the current capability of the engine to achieve such an engine torque command. Alternatively, when crankshaft torque reductions are requested, there may not be a situation where there are positive deficits in engine airflow capability (refer to block 332 and 333), and thus predictive component 301 may not be used under crankshaft torque reduction requests.

The details of predictive component 301 will now be discussed. Block 320 depicts the engine hardware and controls. Engine airflow torque capability 321 may be estimated based on variables including but not limited to intake manifold pressure, engine speed, cam timing, etc. Subtraction junction 322 outputs a difference between engine torque command 312 and engine airflow torque capability 321. Output from subtraction junction 322 thus represents a current engine torque capability deficit 323. In other words, current engine torque capability deficit 323 refers to the deficit between the engine torque command and positive torque the engine is currently capable of producing.

Predictive component 301 further includes block 324, which represents a predicted desired crankshaft torque request. In other words, block 324 represents a predicted or estimated crankshaft torque request a predetermined amount of time (e.g. 40 milliseconds) in the future. Such a prediction may be useful to enable predictive component 301 to compensate for motor torque delay, as will be elaborated further below. Briefly, if there is a delay (e.g. 40 milliseconds) between commanding motor torque to assist the engine in achieving a particular crankshaft torque request, and the commanded motor torque actually being achieved, the predicted desired crankshaft torque request may be used as discussed below to enable the motor to compensate for an engine torque deficit before it happens. For example, during a tip-in transient for which driver demand and crankshaft torque are increasing, a shaped crankshaft torque request sent to the crankshaft may lag behind a raw request which instantly follows a change in accelerator pedal position, such that the crankshaft torque request in, for example, 40 milliseconds, may readily be predicted due to the shaped crankshaft torque command achieving the raw command in a finite amount of time. Determining a motor torque command by comparing the crankshaft torque request in 40 milliseconds to engine torque capability in 40 milliseconds may improve responsiveness to tip-in transients.

Specifically, subtraction junction 325 outputs a difference between predicted desired crankshaft torque 324 and the value obtained at summing junction 305. The output from subtraction junction 325 is then clipped by engine torque limits 390 similar to that discussed above, to obtain predicted engine torque command 326. Predicted engine torque command 326 is then fed into internal engine model 327, to obtain predicted engine airflow torque capability 328. Subtraction junction 329 outputs a difference between predicted engine torque command 326 and predicted engine airflow torque capability 328, the output comprising predicted engine torque capability deficit 330. Block 318 outputs a maximum value 331 between current engine torque capability deficit 323 and predicted torque capability deficit 330. Block 332 then outputs another maximum value between maximum value 331 and 0 (block 333). The output from block 332 thus comprises predictive component output 335.

Predictive component output 335 is added to the output from block 314 at summing junction 316. Output from summing junction 316 is then clipped by motor torque limits 391, to obtain motor torque command 340. Motor torque command 340 is then fed into motor torque response model 341. Specifically, because an electric motor has a predictable delay between its command and its response, the motor torque response model (e.g. pure delay and first order low pass filter) may be used to estimate a difference at subtraction junction 342 between motor torque command 340 and the physical torque it is actually producing (refer to output 343). The difference obtained at subtraction junction 342 is referred to as motor delay torque 345.

Motor delay torque 345 is added to engine torque command 312 at summing junction 346. The engine torque command 312 plus the motor delay torque 345 comprises compensated engine torque command 348. Compensated engine torque command 348 is then clipped by engine torque limits 390, and is then fed to block 320, which comprises the engine hardware and controls as discussed above, such that the compensated engine torque command is used to command engine actuators to achieve the requested compensated engine torque. At a substantially similar time (e.g. within 5 milliseconds or less, 2 milliseconds or less, 1 millisecond or less, 500 microseconds or less, 100 microseconds or less, 500 nanoseconds or less, 100 nanoseconds or less, etc.), motor torque command 340 may be sent to motor hardware and controls 350. Actual engine torque 355 produced by the engine plus (see summing junction 356) actual motor torque 357 produced by the motor comprises actual crankshaft torque 360.

It may be understood that for positive crankshaft torque requests, block 314 may output a zero value, thus rendering the motor torque command based on the predictive component 301. Alternatively, as discussed above, for crankshaft torque reduction requests, the value output from block 314 may comprise a negative value, and output from block 332 may be zero.

Thus, based on the description of control system 300 above, it may be understood that because the motor command (e.g. 340) is not calculated using actual engine torque (e.g. 355) feedback, the engine's torque behavior is instead modified at a point (e.g. summing junction 346) after the motor torque command (e.g. 340) is determined. In this way, the engine's torque behavior may be modified without creating circular logic (e.g. where the motor command is based on engine torque with the engine torque based on motor torque). Thus, control system 300 enables the use of modeled motor torque error to command the engine to produce the compensated engine torque command (e.g. 348) that inherently compensates for the motor's delays. Using the model (e.g. 341) may be preferable to relying on actual motor torque feedback from an inverter, because the model may be used to predict delays, whereas using motor feedback may provide torque information too late for compensating for the motor delays via the engine.

Furthermore, as discussed above, the model (e.g. 341) may be based on a low pass filtered version of the command, which means that the output (e.g. 345) from the model may be equal to the motor torque command in a finite period of time for steady-state conditions. Accordingly, the motor delay compensation torque (e.g. 345) commanded to the engine may also approach zero in a finite amount of time, which thereby may avoid a situation of potentially commanding spark retard to the engine and imposing a decrease in efficiency during steady state operating conditions. For example, if actual motor torque feedback were relied upon rather than the model, there may be a steady state error between the motor command and the estimated motor torque feedback that may modify engine torque for longer periods of time than would be seen via use of control system 300.

Turning now to FIG. 4, a flow chart of a method for compensating motor torque delays in a vehicle torque control system is shown. The method of FIG. 4 may be incorporated and may operate in cooperation with the systems of FIGS. 1-2. Further, at least portions of the method of FIG. 4 may be incorporated as executable instructions stored in non-transitory memory while other portions of the method may be performed by a controller transforming operating systems of devices and actuators in the physical world.

At 405, method 400 determines operation conditions. Operating conditions may include but are not limited to engine speed, BISG torque, ISG torque, driver demand torque, presence or absence of BISG control clutch degradation, engine load, ambient temperature, ambient pressure, vehicle speed, and BISG speed. Method 400 proceeds to 410.

At 410, method 400 includes determining whether a decrease or reduction in crankshaft torque is requested. For example, a vehicle operator releasing the accelerator pedal may comprise a crankshaft torque reduction request. In some examples, such action may be referred to as a tip-out event. If a decrease in crankshaft torque is not requested, method 400 may proceed to 415. At 415, method 400 may include indicating whether a crankshaft torque increase is requested. If such a crankshaft torque increase request is indicated, method 400 may proceed to FIG. 5, where method 500 may be carried out.

Alternatively, if neither an increase nor decrease in crankshaft torque is indicated to have been requested, method 400 may proceed to 420, where current vehicle operating conditions may be maintained. For example, current engine torque commands and current motor torque commands may be maintained. Method 400 may then return to the start of FIG. 4.

Returning to 410, in response to a crankshaft torque reduction request, method 400 may proceed to 425. At 425, method 400 may include determining an engine torque command (e.g. 312) and a motor torque command (e.g. 340) to meet the desired crankshaft torque reduction request. As discussed above with regard to the control system of FIG. 3, determining the engine torque command and the motor torque command may be a function of engine torque limits and any portion of the total desired crankshaft torque request that is specifically allocated to the motor (refer to desired motor torque at block 303).

With the engine torque command determined (refer to 312 of FIG. 3) and the motor torque command determined (refer to 340 of FIG. 3), method 400 may proceed to 430. At 430, method 400 may include estimating a delay (refer to 345 of FIG. 3) which may occur between the motor being commanded and actual motor torque being realized. The delay may be determined via the motor torque response model (e.g. 341) discussed above with regard to FIG. 3.

With the motor torque delay determined at 430, method 400 may proceed to 435. At 435, method 400 may include adjusting the engine torque command to compensate for the motor torque delay. With the engine torque command adjusted based on the motor torque delay, method 400 may proceed to 440. At 440, method 400 may include sending the motor torque command (refer to 340 of FIG. 3) to the motor and the adjusted or compensated engine torque command (refer to 348 of FIG. 3) to the engine in order to achieve the desired crankshaft torque reduction request.

As will be elaborated in further detail below, by compensating for the motor torque delay, the method of FIG. 4 may allow for reducing or avoiding an issue of actual crankshaft torque overshooting the crankshaft target in the negative direction, which may otherwise occur if the motor torque delay is not accounted for. More specifically, the method of FIG. 4 may enable the reduction or avoidance of actual crankshaft torque overshooting the crankshaft target in the negative direction in response to transient crankshaft torque reduction requests, by placing emphasis on coordination of the engine and motor to account for motor torque delays, before any commands are sent to the engine.

Returning to 415, if an increase in crankshaft torque is indicated, method 400 may proceed to FIG. 5. Accordingly, turning now to FIG. 5, another example flow chart of a method for compensating motor torque delays in a vehicle torque control system is shown. The method of FIG. 5 may continue from the method of FIG. 4, and may be incorporated and may operate in cooperation with the systems of FIGS. 1-2. Further, at least portions of the method of FIG. 5 may be incorporated as executable instructions stored in non-transitory memory while other portions of the method may be performed by a controller transforming operating systems of devices and actuators in the physical world.

At 510, method 500 may include determining an engine torque command (refer to 312 of FIG. 3), which as discussed above may be based on the desired crankshaft torque (refer to block 304) and any portion of the total desired crankshaft torque request that is specifically allocated to the motor (refer to desired motor torque at block 303).

Proceeding to 515, method 500 may include determining a current engine torque capability deficit and a predicted engine torque capability deficit. Specifically, the current engine torque capability deficit (refer to 323 of FIG. 3) may be determined based on a difference between the engine torque command determined at step 510 and a current engine airflow torque capability (refer to 321 of FIG. 3). Similarly, the predicted engine torque capability deficit (refer to 330 of FIG. 3) may be determined based on a difference between a predicted engine torque command (refer to 326 of FIG. 3) and a predicted engine airflow torque capability (refer to 328 of FIG. 3).

Continuing to 520, method 500 may include determining if a maximum value between the current engine torque capability deficit and the predicted engine torque capability deficit is greater than zero (refer to block 322 of FIG. 3). If not, then it may be understood that at the current time, the engine is not restricted in its ability to meet the desired crankshaft torque request, and thus method 500 proceeds to 525 where the engine is commanded to respond to the increase in engine torque command. Method 500 may then return to 515 where the current engine torque capability deficit and the predicted engine torque capability deficit are continued to be determined.

Returning to 520, in response to the maximum value between the current engine torque capability deficit and the predicted engine torque capability deficit being greater than zero, method 500 may proceed to 530. At 530, method 500 may include determining the motor command (refer to 340 of FIG. 3) based on the maximum value between the current engine torque capability deficit and the predicted engine torque capability estimate. Specifically, referring again to FIG. 3, the motor torque command may be based on the output from block 332, or in other words, based on the predictive component output (refer to 335 at FIG. 3). Thus, it may be understood that the motor torque command determined at 530 may be based at least in part on an internal engine model (refer to 327 of FIG. 3). In this way, a maximum engine torque capability in the near future may be predicted such that the motor may be commanded to fill in for an impending engine torque deficit before it happens, as will be further elaborated below.

Accordingly, with the motor torque command determined, method 500 may proceed to 535. At 535, method 500 may include estimating motor torque delay via the motor torque response model, in similar fashion as discussed above with regard to step 430 of method 400. Based on the motor torque delay, an adjusted or compensated engine torque command (refer to 348 of FIG. 3) may be determined at 540. Proceeding to 545, method 500 may include sending the motor torque command (refer to 340 of FIG. 3) to the motor and the adjusted or compensated engine torque command (refer to 348 of FIG. 3) to the engine in order to achieve the desired crankshaft torque increase request. Method 500 may then return to the start of FIG. 4.

Turning now to FIG. 6, an example timeline 600 for compensating motor torque delays according to the methods of FIGS. 4-5, is shown. Timeline 600 includes plot 605, indicating a crankshaft torque command, and plot 610, depicting an actual crankshaft torque, over time. Timeline 600 further includes plot 615, indicating a motor torque command, and plot 620, indicating actual motor torque, over time. Timeline 600 further includes plot 625, indicating a predicted engine torque command, plot 630, indicating an actual engine torque command, plot 635, indicating an actual engine torque, plot 640, indicating an actual maximum engine airflow torque capability, and plot 645, indicating a predicted maximum engine airflow torque capability, over time. For each of the plots corresponding to the crankshaft, motor and engine, the vertical axis depicts torque in Newton-meters.

At time t0, the crankshaft is commanded to 100 N-m (plot 605), and the actual torque produced by the crankshaft (plot 610) is also 100 N-m. The motor is not currently being used (refer to plots 615 and 620), with the engine alone meeting the crankshaft torque demand (plot 635). Such conditions are maintained between time t0 and t1.

Prior to time t1, a predicted engine torque decrease is indicated. Such a prediction may be possible based on the shaped crankshaft torque request lag as compared to the raw request; however, such a prediction is not specifically relied upon for crankshaft torque reduction requests, as discussed above with regard to the control system of FIG. 3, and the methods of FIGS. 4-5.

At time t1, a reduction in desired crankshaft torque is requested via the vehicle operator (plot 605). Specifically, the crankshaft is commanded from 100 N-m down to −60 N-m. For the reduction in crankshaft torque, in this example timeline it may be understood that the desired motor torque command (refer to block 303 of FIG. 3) is utilized to allocate −60 N-m to the crankshaft torque reduction request (plot 615). While not explicitly illustrated, it may be understood that in this example timeline 600, the minimum amount of torque the engine can produce −10 N-m. However, because −60 N-m is allocated to the crankshaft torque reduction request, the engine can be commanded to 0 N-m, and as such the negative capability of the engine in terms of torque reduction capability is not exceeded. Accordingly, between time t1 and t2, the engine is commanded to produce 0 N-m of torque (plot 630) and the motor is commanded to produce −60 N-m of torque (plot 615). In response to the motor command, actual motor torque (plot 620) decreases between time t1 and t2, and responsive to the engine command, actual engine torque (plot 635) decreases between time t1 and t2. While not explicitly illustrated, it may be understood that the actual engine torque command between time t1 and t2 comprises an adjusted or compensated engine torque command, based on a determined motor delay torque (refer to 345 of FIG. 3). In this way, actual crankshaft torque (plot 610) achieves the commanded crankshaft torque (plot 610) without any overshoot in the negative direction. Because the engine is not commanded to its minimum capability for the reduction, the amount of spark retard for reducing engine torque may be lessened as compared to a situation where the engine was commanded to its minimum capability. Furthermore, the negative torque (e.g. −60 N-m) may be used to charge the battery and assist the engine in delivering the commanded reduction in crankshaft torque.

Between time t2 and t3, the crankshaft command remains steady, and accordingly, there are no modifications to the motor torque command nor the engine torque command. However, at time t3, it is predicted that an increase in engine torque will soon be commanded (refer to predictive component 301 and predicted engine torque command 326 at FIG. 3). Indeed, at time t4, a crankshaft torque increase is commanded (plot 605), and accordingly, an increase in engine torque is commanded (plot 630).

Based on the crankshaft torque increase request, the control system of FIG. 3 relies on predictive component 301 to assess when the predicted engine torque command (plot 625) becomes more positive than the maximum engine airflow capability (plot 640). In example timeline 600, the predicted engine torque command exceeds the maximum engine airflow torque capability at time t5. Accordingly, once this occurs, the motor is commanded to increase (plot 615) to fill in for the impending engine torque deficit prior to it actually occurring. Specifically, other algorithms which will be discussed in further detail below which make use of the motor torque delay response model, but which do not include the predictive component (e.g. 301), may have to wait until actual engine torque exceeds the maximum engine airflow torque capability (which occurs in this example timeline at time t6) in order to begin ramping up motor torque. By using the predictive component of the control system of FIG. 3, the motor torque command may be initiated earlier, when the predicted engine torque command exceeds the maximum airflow torque capability. This may enable the actual crankshaft torque increase (plot 610) to more closely match the crankshaft torque increase commanded (plot 605) as compared to other methodologies which do not employ the predictive component (e.g. 301). Accordingly, in response to the motor torque command increasing at time t5, actual motor torque (plot 620) increases shortly thereafter.

At time t7, the actual engine torque command (plot 630) is equivalent to the commanded amount of crankshaft torque (plot 605). However, there still remains a deficit between the engine torque command and the maximum engine airflow torque capability, which is filled in via the motor. However, engine airflow torque capability begins to rise around time t7. It may be understood that the slow increase in engine airflow torque capability is due to an inherent delay in building up intake manifold pressure in response to changes in throttle angle, supercharger/turbocharger actuation, camshaft angle changes, etc. At time t8, via the combined use of the motor and the engine, actual crankshaft torque (plot 610) reaches the requested crankshaft torque (plot 605). Because the control strategy of FIG. 3 is utilized, the actual crankshaft torque does not overshoot the steady-state crankshaft torque request, which may otherwise occur if the motor delay was not accounted for via the motor torque response model as discussed above. Specifically, spark retard may be used by the engine to compensate for a time lag between the motor command and actual motor torque, to ensure that the crankshaft torque does not overshoot the requested crankshaft torque in the positive direction.

After time t8, with the actual crankshaft torque having reached the commanded crankshaft torque, and with the maximum engine airflow capability increasing in the direction of the commanded amount of torque, reliance on the motor is phased out so that in a finite amount of time the engine is meeting the commanded crankshaft torque.

The control system of FIG. 3 relies on the predictive component (e.g. 301) for improving crankshaft responsiveness to positive crankshaft torque increase requests, while additionally the reliance on the motor torque delay response model serves to enable the crankshaft to meet its commanded target without overshoot, both in the positive and negative direction. Turning now to FIG. 7A, another control system 700 is shown, which does not include the predictive component but which is additionally capable of enabling actual crankshaft torque to meet its requested targets without overshooting in both the positive and negative directions. However, it may be understood that actual crankshaft torque response to positive crankshaft torque increase requests may be slightly less responsive when using the control system of FIG. 7A as compared to when the control system of FIG. 3 is utilized.

Numerous components of the control system of FIG. 7A are the same as FIG. 3. For brevity, blocks, outputs, summing junctions and subtraction junctions, etc., that are the same or serve the same function are referred to by common numerals.

The main difference between the control system of FIG. 7A and the control system of FIG. 3 is that control system 700 includes block 740, and does not include blocks 314, 315 and 316, nor the predictive component 301. Block 740 at FIG. 7A outputs a minimum value between the engine torque command 312 and the engine airflow torque capability 321 to subtraction junction 313. The result is that for crankshaft torque reduction requests, the value output from block 740 to subtraction junction 313 is the engine torque command 312, which is clipped by block 308. As discussed above, block 308 represents the minimum torque the engine can produce given an allowable torque reduction for current combustion stability, emissions, etc. In other words, it may be unlikely that the output from block 740 to subtraction junction 313 comprises the engine airflow torque capability 321, since a minimum engine airflow capability is not usually reached. Said another way, the engine airflow torque capability 321 in terms of crankshaft torque reduction requests does not have much of an impact.

However, when positive crankshaft torque increases are requested, control system 700 relies heavily on the engine airflow torque capability 321, because the engine torque command 312 is likely greater than the current engine airflow torque capability, and due to block 740 taking the minimum between the engine torque command 321 and the engine airflow torque capability 321, the engine airflow torque capability 321 is likely output from block 740 to subtraction junction 313 for positive crankshaft torque increases as opposed to the engine torque command 312. Thus, a reason that control algorithm 700 may be slightly less responsive in terms of actual crankshaft torque response to crankshaft torque increase commands than control algorithm 300, is because engine airflow torque capability 321 is a form of an engine feedback estimate. Control system 300 avoids this issue by predicting the instantaneous maximum engine torque capability in the near future to use the motor to fill in for impending engine torque deficits before they happen, as discussed. However, while control system 700 may be slightly less responsive than control system 300 in terms of actual crankshaft torque meeting the crankshaft request, control system 700 also relies on the motor torque response model which enables actual crankshaft torque to meet crankshaft torque targets in both the positive and negative direction, without overshoots, similar to control system 300.

Turning now to FIG. 7B, it depicts another control system 750 that represents an improvement to control system 700. Accordingly, blocks, outputs, subtraction junctions, summing junctions, etc., that are the same between control system 700 and control system 750 are depicted by common numerals.

The improvement made as per control system 750 comprises a long term compensation for engine torque errors. For example, a simple control system as discussed above that relies on engine feedback for controlling motor torque automatically compensates for steady state torque errors. However, the control system of FIG. 7A relies on the engine torque command for motor coordination and assumes that the engine can eventually achieve the particular desired torque. While such an assumption may be valid for a vast majority of operating conditions, there may be instances where the engine cannot actually achieve a particular desired torque even though it is not necessarily limited upstream. To cover such a situation, another compensation loop may be added as illustrated at FIG. 7B, which compares (refer to subtraction junction 755) compensated engine torque command 348 (taken after motor delay torque compensation is added to engine torque command 312 and coordination with the motor is established) to estimated actual engine torque 355 to obtain engine torque error estimate 760. If engine torque error estimate 760 were simply added back to the motor path, it may introduce potential for noise and oscillations in engine torque estimation to influence the motor, and may additionally or alternatively introduce a path for circular logic since engine torque feedback would thereby directly influence the motor torque command and feed back into the engine command through the motor delay torque calculation. Accordingly, to avoid such issues and still provide steady state engine torque error compensation, included in control system is filter 770 with a long time constant (e.g. 1 second) that may filter out any engine torque oscillation and eliminate issues related to circular logic and positive feedback, yet still provide long term compensation for engine torque delivery errors with the motor. Accordingly, output from filter 770 is input to summing junction 780, which additionally receives input from subtraction junction 313.

Turning now to FIG. 8, another example flow chart of a method for compensating motor torque delays in a vehicle torque control system is shown. The method of FIG. 8 may be incorporated and may operate in cooperation with the systems of FIGS. 1-2. Further, at least portions of the method of FIG. 8 may be incorporated as executable instructions stored in non-transitory memory while other portions of the method may be performed by a controller transforming operating systems of devices and actuators in the physical world. Specifically, it may be understood that the flow chart of FIG. 8 may utilize the control system of FIG. 7A, and will be further discussed with regard to the control system of FIG. 7B.

At 805, method 800 determines operation conditions. Operating conditions may include but are not limited to engine speed, BISG torque, ISG torque, driver demand torque, presence or absence of BISG control clutch degradation, engine load, ambient temperature, ambient pressure, vehicle speed, and BISG speed. Method 800 proceeds to 810.

At 810, method 800 includes determining desired crankshaft torque (refer to block 304 of FIG. 7A). Proceeding to 815, method 800 includes determining an engine torque command (e.g. 312 of FIG. 7A) based on a difference between desired crankshaft torque and desired motor torque (refer to block 303 of FIG. 7A). Continuing to block 820, method 800 includes determining a motor torque command (e.g. 340 of FIG. 7A) based on a difference between desired crankshaft torque and a minimum value between the engine torque command and a current engine airflow torque capability (refer to 321 of FIG. 7A). Next, at 825, method 800 includes determining a motor delay torque estimate (refer to 345 of FIG. 7A) as a difference between the motor torque command and an estimate of actual motor torque based on a motor torque response model (refer to 341 of FIG. 7A).

Proceeding to 830, method 800 includes adding the motor delay torque estimate to the engine torque command to obtain a motor torque delay compensated engine torque command (refer to 348 of FIG. 7A). Continuing at 835, method 800 may include commanding engine actuators to produce engine torque based on the motor delay compensated engine torque command, and commanding the motor to produce motor torque based on the motor torque command. Method 800 may then return to the start of FIG. 8.

Because the control systems of FIGS. 7A-7B are substantially similar aside from the feedback comprising the engine error torque estimate, a separate method for control system 750 is not shown for brevity. However, it may be understood that methodology for control system 750 may simply include determining an engine torque error estimate after step 830 as a difference between the motor delay compensated engine torque command and an actual engine torque estimate, filtering the engine torque error estimate via a filter with a long time constant (e.g. 770 at FIG. 7B), and then adding the filtered engine torque error estimate to the motor command. Accordingly, to distinguish from the control system of FIG. 7A, step 840 is depicted as a dashed box.

Turning now to FIG. 9, an example timeline 900 for compensating motor torque delays according to the method of FIG. 8, is shown. Timeline 900 includes plot 905, indicating a desired crankshaft torque, and plot 910, indicating an actual crankshaft torque, over time. Timeline 900 further includes plot 915, indicating a current actual maximum engine airflow torque capability, plot 920, indicating an engine torque command, and plot 925, indicating an actual engine torque, over time. Timeline 900 further includes plot 930, indicating a motor torque command, plot 935, indicating an actual motor torque, and plot 940, indicating an estimate of motor torque delay between the motor torque command and actual motor torque, over time. For plots corresponding to the crankshaft, engine, and motor, it may be understood that the vertical axis depicts torque in Newton-meters. In this example timeline 900, it may be understood that the motor is capable of producing torque in a range of −75 N-m to 75 N-m, and the engine is capable of producing torque in a range of −10 N-m and 600 N-m.

At time t0, the desired crankshaft torque is 100 N-m (plot 905), and the actual crankshaft torque is 100 N-m. The desired crankshaft torque is being met via the engine, which is producing 100 N-m of torque (plot 925). The motor is not producing torque at time t0. Such conditions are maintained between time t0 and t1.

At time t1, a crankshaft torque reduction request is indicated (plot 905). The request includes an overall reduction in crankshaft torque from the 100 N-m down to −60 N-m. As discussed, the engine is capable of producing −10 N-m. Thus, the engine torque command is clipped at −10 N-m (refer to block 308 of FIG. 7A, for example). Thus, the torque deficit is made up via the motor. Because the motor does not rely on direct feedback from the engine, the motor torque command (plot 930) does not attempt to track with the engine torque command (plot 920), but rather is commanded to its final value between time t2 and t3, which is the difference between the engine torque command (−10 N-m) and the desired crankshaft torque (−60 N-m). However, there is a delay (plot 940) between the motor torque command (plot 930) and the actual motor torque (plot 935). Using the methodology of FIG. 8, this delay is compensated for via the motor torque response model by adjusting the engine torque command as discussed above. Accordingly, at time t3, actual crankshaft torque (plot 910) reaches the desired crankshaft torque (plot 905), without overshooting its steady-state target in the negative direction. While not explicitly illustrated, it may be understood that if engine feedback were relied upon for in a system where the motor torque response model was not included for coordinating engine and motor commands, actual crankshaft torque may overshoot the desired crankshaft torque target in the negative direction.

Between time t3 and t4, the desired crankshaft torque is maintained steady, and coordination between the engine torque command and the actual crankshaft torque (plot 910) matches the desired crankshaft torque (plot 905).

At time t4, an increase in crankshaft torque is requested. It may be understood that between time t4 and t5, the engine torque command (plot 920) remains below the engine airflow torque capability (plot 915), and thus the engine is capable of meeting the desired crankshaft torque request and the negative motor torque contributed by the motor is phased out. A difference between the engine torque command (plot 920) and the desired crankshaft torque (plot 905) is used as input to the motor torque response model, which takes into account the delay (plot 940) between the motor torque command (plot 930) and actual motor torque (plot 935) for compensating the engine torque command (plot 920), according to the method of FIG. 8.

At time t5, the engine torque command (plot 920) exceeds the engine airflow torque capability (plot 915). Accordingly, beginning at time t5, rather than relying on the difference between the desired crankshaft torque and the engine torque command, because the engine torque command has exceeded the engine airflow torque capability, the difference between the desired crankshaft torque and the engine airflow torque capability is used as input to the motor torque response model. The result is that the motor is commanded to make up the deficit between the torque the engine is capable of producing, and the desired crankshaft torque and hence the engine torque command. As discussed above with regard to the timeline of FIG. 6, if the control system of FIG. 3 that relies on predicting such a deficit were instead utilized, the increase in motor torque may occur earlier (when it is predicted that the engine torque command will exceed the engine airflow torque capability of the engine).

Between time t5 and t6, the difference between the engine torque command and the capability of the engine is such that the motor torque command, and hence actual motor torque, saturates at the maximum amount of torque the motor can produce. After time t6, it is clear from the timeline that actual engine torque (plot 925) does not directly follow its maximum brake torque capability, or engine airflow torque capability (plot 915), indicating that the control system (refer to the method of FIG. 8) appreciates that actual motor torque will be over-delivering torque as the motor attempts to track a decreasing target, and thus the engine is commanded to reduce its torque using spark retard to compensate. Since the engine isn't at MBT, there is a trade-off in fuel efficiency for better torque accuracy, as is evident by the fact that after time t6 the actual crankshaft torque (plot 910) reaches its target without any overshoot in the positive direction.

While not explicitly illustrated at FIG. 9, it may be understood that in some examples a desired amount of motor torque (refer to 303 at FIG. 7A, for example) may be used to dynamically allocate a portion of the desired crankshaft torque request to the motor, as discussed. In this way, in cases where the desired crankshaft torque request is more negative than what the engine is capable of producing, the engine may not be commanded to its minimum torque, but rather some value greater than the minimum as a function of how much negative motor torque is allocated to the crankshaft torque request. This may reduce an amount of spark retard used by the engine, since the engine does not have to reduce torque as far, while additionally charging the battery, which may be advantageous in terms of energy-use management for the vehicle.

In other examples, rather than a negative torque being used to allocate a portion of desired crankshaft torque to the motor, a positive torque may be allocated when relying on the control systems discussed herein with regard to FIG. 3, FIG. 7A and FIG. 7B. For example, in response to a request for a step increase in positive crankshaft torque, the entire amount of the positive step may be allocated to the motor instead of the engine. This may enable the engine to stay at a constant, efficient torque throughout the step up in crankshaft torque. For example, in a case where the motor is not being used at a time of a positive step increase request in crankshaft torque, the motor command may be equivalent to the positive step. Then, when the step is removed such that the motor torque is commanded back to zero torque, the motor torque response model of the algorithms discussed herein may account for a motor torque delay by using spark retard to decrease engine torque to compensate for the delay in motor torque decrease. Compensating for the motor torque delay in response to the step decrease may improve responsiveness at an expense of a slight amount of efficiency.

Thus, discussed herein a method may comprise a driveline operating method comprising controlling a motor and an engine via commanding a motor torque in response to an engine torque command and a requested motor torque, and commanding an engine torque in response to a requested engine torque and output of a motor torque model.

In such a method, the output of the motor torque model may include an estimate of a time delay between the commanded motor torque and an actual motor torque.

In such a method, the requested motor torque may comprise a difference between the commanded engine torque and a target crankshaft torque under circumstances where the target crankshaft torque is less than a current crankshaft torque. The requested motor torque may be based in part on a current engine airflow torque capability under circumstances where the target crankshaft torque is greater than the current crankshaft torque. The requested motor torque may comprise a difference between the target crankshaft torque and the current engine airflow torque capability. The requested motor torque may comprise a maximum value between a current deficit between the commanded engine torque and the current engine airflow torque capability, and a predicted deficit between a predicted engine torque command and a predicted engine airflow torque capability. The engine torque command may comprise a difference between the target crankshaft torque and a predetermined motor torque.

In such a method, the engine may comprise a spark-ignition engine, where commanding the engine torque may include retarding a timing of spark provided to the engine.

In such a method, commanding the engine torque may comprise one of deactivating one or more cylinders of the engine, controlling a height of one or more intake and/or exhaust valves of the one or more cylinders of the engine, and reducing or stopping injection of fuel to the one or more cylinders of the engine.

In such a method, commanding the engine torque may be in response to the requested engine torque and is decoupled from output of the motor torque response model based on a selectable driving mode.

In another example, a powertrain operating method comprises in a first condition, commanding a motor torque for a motor based on a difference between a target crankshaft torque and an engine torque command, in a second condition, commanding the motor torque based on a prediction of a difference between the engine torque command and a maximum engine airflow torque capability, and in both the first condition and the second condition, commanding an engine torque for an engine based on a motor torque response model that outputs a motor delay torque estimation that is added to the engine torque command to compensate for a motor delay.

In such a method, the first condition may comprise the target crankshaft torque being below an ability of the engine to meet the target crankshaft torque. The second condition may comprise the engine torque command being greater than the maximum engine airflow torque capability.

In such a method, commanding the engine torque may further comprise retarding a spark provided to the engine.

In such a method, commanding the motor torque is not based on an actual engine torque.

In such a method, the engine torque command may comprise a difference between the target crankshaft torque and a predetermined motor torque.

In such a method, commanding the motor torque in the second condition based on the prediction of the difference between the engine torque command and the maximum engine airflow torque capability may further comprise obtaining a maximum value between the prediction of the difference between the engine torque command and the maximum engine airflow torque capability and a current difference between the engine torque command and the maximum engine airflow torque capability, where the maximum value is used for commanding the motor torque in the second condition.

With regard to the powertrain operating method discussed above, the method may include determining the first condition, and in response thereto performing the action of commanding the motor torque for the motor based on a difference between the target crankshaft torque and the engine torque command. The method may further include determining the second condition, and in response thereto commanding the motor torque based on a prediction of a difference between the engine torque command and a maximum engine airflow torque capability. Regardless of whether the first condition is determined or the second condition is determined, the engine torque for the engine may be commanded based on the motor torque response model that outputs a motor delay torque estimation that is added to the engine torque command to compensate for the motor delay. Determining the first condition may be via the controller comparing a difference between a target crankshaft torque and an engine torque command, whereas determining the second condition may be via the controller predicting a difference between the engine torque command and a maximum engine airflow torque capability of the engine. Commanding the motor torque in both the first and the second condition may include the controller sending a signal to the motor to actuate the motor to rotate. Commanding the engine torque may include controlling an engine actuator to achieve the engine torque. In some examples, the method may include determining whether to command the motor torque for the motor based on the difference between the target crankshaft torque and the engine torque command, or to command the motor torque based on the prediction of the difference between the engine torque command and the maximum engine airflow torque capability, based on whether it is determined that the first condition is present or that the second condition is present. It may be understood that in some examples the method may include transitioning between the first condition and the second condition.

An advantage of the control systems discussed herein may be to enable the hybrid system to respond to positive step crankshaft torque requests without needing to rely on torque reserve. For example, for hybrid systems that do not rely on one of the control systems discussed herein, responsive to a positive step request for crankshaft torque, such a vehicle may build up airflow torque capability by the amount equivalent to the step immediately before the event, and may then rely on spark retard to maintain a constant actual engine torque until the torque increase is commanded. Then, such a vehicle may use fast spark torque actuation to achieve the initial step up, but at the expense of fuel efficiency. An alternative approach for such a vehicle may be to build up engine airflow torque reserve prior to the step up event, but instead keep the engine at maximum brake torque and use negative motor torque to absorb the extra torque capability to avoid using spark retard. Then, the negative motor charging torque may be removed to increase the total crankshaft torque when the step up event occurs.

The control systems of the present disclosure may enable use of the motor to provide the initial torque increase responsive to such a step event, and then blend it away as engine torque increases. Because the control systems discussed herein rely on the motor torque response model, the desired crankshaft step up may be met without an overshoot in the positive direction since the motor command is not based on actual engine torque feedback, and may further be met without relying on torque reserve. In such an example, when the positive step is removed, the control systems of the present disclosure may adjust engine torque command based on the motor torque command such that the engine utilizes some engine spark torque reduction to assist with quickly decreasing torque in response to the end of the step up event, resulting in the desired crankshaft torque request being then met in the negative direction, without actual crankshaft torque overshooting the desired crankshaft torque in the negative direction.

Yet another advantage of the control systems discussed herein for coordinating engine and motor torque commands pertaining to FIG. 3, FIG. 7A and FIG. 7B may comprise robustness to engine torque estimation and production errors. For example, control systems that rely on engine feedback for controlling motor torque commands may pass any oscillation or noise from the engine to the motor torque command, and eventually to the actual motor torque, regardless of whether the engine is actually oscillating or if there is some other issue with the engine torque feedback estimate. In such an example, because there is a delay in motor torque, this may mean that the oscillating engine and motor torques may potentially constructively interact with each other to create a total crankshaft oscillation with a greater amplitude than the engine torque oscillation alone would contribute if the motor were not present in the vehicle. Alternatively, because the control systems for coordinating engine and motor torque discussed herein base the motor command on the engine torque command and not actual feedback, there may be a reduced potential for such an adverse interaction, resulting in such an effect of oscillation being reduced or avoided. Furthermore, along similar lines the control systems of the present disclosure with regard to FIGS. 7A and 7B may be advantageous for situations where an oscillating torque is being commanded to the engine for some reason (e.g. driveline shuffle damping), because the motor delay compensation may allow for improved alignment of engine and motor torque, which may allow the crankshaft to be better able to track the amplitude and frequency of an oscillating input with two actuators (motor and engine) that have different bandwidth and response.

It may be understood that the control systems of FIG. 3, FIG. 7A and FIG. 7B are designed to preferentially use the motor as much as possible to assist the engine and minimize the use of, for example, spark retard in order to increase efficiency. However, the motor delay torque transiently utilizes ignition spark retard to compensate for motor delays, which may introduce a loss in efficiency in exchange for torque accuracy and controllability. The desired motor torque input of the control systems of FIG. 3, FIG. 7A and FIG. 7B can also have a significant effect on the behavior of the system(s) both in terms of performance and engine fuel use. Thus, there may be instances in which the overall system may tolerate torque delivery errors, and it may be desirable to turn off the motor delay torque functionality to avoid using spark retard to increase efficiency (e.g. a normal or economy mode of operation). There may be other instances in which torque accuracy and performance are a higher priority than efficiency (e.g. sport or track mode). In such circumstances, it may be desirable for the system to be configured for maximum performance and to allow the use of spark regard as much as required. Thus, one way to make such a determination may be via driver selectable modes, however in other examples the control system itself may determine an appropriate mode and make adjustments based on the determined mode.

While the above description pertains to spark ignition engines, it may be understood that diesel engines may be able to use a similar strategy. However, a diesel engine may have different requirements for coordination to improve efficiency. For example, for spark ignition engines, it is desirable to use spark to operate the engine at the maximum brake torque operating point as much as possible to increase fuel efficiency, and to use the motor to capture any excess power not desired for crankshaft output torque in the battery. To quickly decrease crankshaft torque using spark retard for motor delay fill in torque as discussed herein, such use of spark retard may be used as little as possible, by decreasing the motor torque as quickly as possible.

For a diesel engine, torque may be decreased by reducing the fuel injected into the cylinder, or by changing the timing of fuel injection. This means that producing a lower torque with the engine when a total crankshaft torque reduction is commanded may be most efficient, since such action directly leads to a reduction in fuel (subject to emissions constraints). What this means is that for diesel engine vehicles that employ one of the control systems discussed herein, it may be desirable to utilize the diesel engine to produce all torque decreases down to the negative capability of the engine to produce negative torque, and rely on the motor for circumstances where total desired crankshaft torque is below the ability of the engine to achieve that torque request.

Where having a motor may increase diesel efficiency may be during requests to increase crankshaft torque. For example, instead of changing engine torque to follow a fast moving command (which requires an increased amount of fuel and can potentially decrease efficiency and increase emissions production), the diesel engine may be allowed to slowly ramp up torque while the motor automatically fills in the engine's torque lag with positive electrical torque. For example, similar to the time after t4 in FIG. 9 where engine torque is increasing, a vehicle with a diesel engine and a motor using the control strategy of FIG. 7A or 7B may enable use of an estimate of engine torque capability to calculate an amount of torque to fill in with the motor, where the engine may track its own torque command in addition to the motor delay compensation torque. Thus, in a situation where the motor is boosting diesel engine torque, the motor delay compensation torque may be negative (similar to plot 940 just after time t6 at FIG. 9) which means a reduction in fuel use may be commanded to the engine to prevent a steady-state crankshaft target overshoot in the positive direction, as the actual crankshaft torque approaches the steady-state crankshaft target. In this way, torque control accuracy and fuel efficiency may be improved for a vehicle with a diesel engine and a motor that employs the control systems of, for example FIG. 7A or FIG. 7B. Such behavior as that just discussed may be achieved for a vehicle with a diesel engine and a motor provided that the desired motor torque command (refer to block 303, for example at FIG. 7A) is set to zero, or is limited to positive values for transient events. There may be instances in which long term negative values for desired motor torque may be desirable to increase diesel fuel use to charge the battery, so limiting the desired motor torque to positive values may only be applied in response to recognition of a transient event.

It may be understood that, while spark retard (e.g. spark-ignition engines) and reducing or changing a timing of fuel injection (e.g. diesel engines) has been discussed with regard to quickly reducing engine torque, other methodologies are within the scope of the present disclosure. For example, in the case of a variable displacement engine, dynamic skip fire methodology may be utilized, where one more engine cylinders may be deactivated by commanding intake and exhaust valves closed, and which may additionally include cutting off fuel to the one or more deactivated cylinders. In another example, an engine may rely on variable valve lift technology in order to control a height of one or more intake and/or exhaust valve(s) coupled to one or more engine cylinders, in order to quickly reduce engine torque. A few examples have herein been provided, however other methods of quickly reducing engine torque are within the scope of this disclosure.

In this way, the systems and methods discussed herein enable an ability to determine a motor torque command based on an engine torque command, and then modify the engine torque command based on an estimated motor delay, prior to sending the motor torque command to the motor and the modified engine torque command to the engine. This enables the ability to control the motor without relying on feedback comprising actual engine torque.

The technical effect of compensating motor delay in the manner discussed herein is that crankshaft torque accuracy may be improved. Specifically, systems that rely on actual engine torque as feedback for controlling the motor may result in actual crankshaft torque overshooting a desired crankshaft torque in both a positive and a negative direction. By relying on the systems and methods discussed herein, spark retard may be used for spark-ignition engines to transiently fill in for motor torque response lag caused by predictable communication and inverter actuation delays to make the system respond faster in the negative direction than the motor can do alone. This may improve response at the expense of a small loss of efficiency, which may be important for the beginning of an upshift speed phase and the end of power on a downshift speed phase.

Another technical effect is that the systems and methods discussed herein allow for using the motor to limit or eliminate airflow torque reserve requested from the engine to prepare for possible future torque increase requests by assisting the engine while airflow torque is increasing. Alternatively, the motor may be used to produce a negative torque to charge the battery when there is a request for torque reserve to avoid using spark retard to make up the difference between airflow torque capability above the actual desired crankshaft torque.

Yet another technical effect is that the systems and methods discussed herein enable the motor to accomplish short-term requests for increased torque without engine assistance to allow the engine to be maintained at a constant torque.

Yet another technical effect is that the systems and methods discussed herein decouple the motor from potential issues involving irregular engine torque delivery or feedback estimation issues. Reliance on the slow, steady state engine torque error estimation to add a compensation term to the motor torque command enables the motor to compensate for long term (e.g. more than one second) engine torque delivery problems if they exist.

Yet another technical effect is that the systems and methods discussed herein enable near-term prediction of the engine torque command and the resulting engine air flow torque capability response to the command to transiently predict a positive engine torque deficit to command positive torque to the motor earlier and increase crankshaft response.

Yet another technical effect is that the systems and methods discussed herein allow for commanding the engine and the motor in parallel, and to provide minimal delay between a torque command and actuation, important for a closed-loop controller.

The systems and methods discussed herein may enable one or more systems and one or more methods. In one example, a driveline operating method comprises controlling a motor and an engine via commanding a motor torque in response to an engine torque command and a requested motor torque; and commanding an engine torque in response to a requested engine torque and output of a motor torque model. In a first example of the method, the method further includes wherein the output of the motor torque model includes an estimate of a time delay between the commanded motor torque and an actual motor torque. A second example of the method optionally includes the first example, and further includes wherein the requested motor torque comprises a difference between the commanded engine torque and a target crankshaft torque under circumstances where the target crankshaft torque is less than a current crankshaft torque. A third example of the method optionally includes any one or more or each of the first and second examples, and further includes wherein the requested motor torque is based in part on a current engine airflow torque capability under circumstances where the target crankshaft torque is greater than the current crankshaft torque. A fourth example of the method optionally includes any one or more or each of the first through third examples, and further includes wherein the requested motor torque comprises a difference between the target crankshaft torque and the current engine airflow torque capability. A fifth example of the method optionally includes any one or more or each of the first through fourth examples, and further includes wherein the requested motor torque comprises a maximum value between a current deficit between the commanded engine torque and the current engine airflow torque capability, and a predicted deficit between a predicted engine torque command and a predicted engine airflow torque capability. A sixth example of the method optionally includes any one or more or each of the first through fifth examples, and further includes wherein the engine torque command comprises a difference between the target crankshaft torque and a predetermined motor torque. A seventh example of the method optionally includes any one or more or each of the first through sixth examples, and further includes wherein the engine comprises a spark-ignition engine; and wherein commanding the engine torque includes retarding a timing of spark provided to the engine. An eighth example of the method optionally includes any one or more or each of the first through seventh examples, and further includes wherein commanding the engine torque comprises one of deactivating one or more cylinders of the engine, controlling a height of one or more intake and/or exhaust valves of the one or more cylinders of the engine, and reducing or stopping injection of fuel to the one or more cylinders of the engine. A ninth example of the method optionally includes any one or more or each of the first through eighth examples, and further includes wherein commanding the engine torque is in response to the requested engine torque and is decoupled from output of the motor torque response model based on a selectable driving mode.

An example of a powertrain operating method comprises in a first condition, commanding a motor torque for a motor based on a difference between a target crankshaft torque and an engine torque command; in a second condition, commanding the motor torque based on a prediction of a difference between the engine torque command and a maximum engine airflow torque capability; and in both the first condition and the second condition, commanding an engine torque for an engine based on a motor torque response model that outputs a motor delay torque estimation that is added to the engine torque command to compensate for a motor delay. In a first example of the method, the method further includes wherein the first condition comprises the target crankshaft torque being below an ability of the engine to meet the target crankshaft torque; and wherein the second condition comprises the engine torque command being greater than the maximum engine airflow torque capability. A second example of the method optionally includes the first example, and further includes wherein commanding the engine torque further comprises retarding a spark provided to the engine. A third example of the method optionally includes any one or more or each of the first through second examples, and further includes wherein commanding the motor torque is not based on an actual engine torque. A fourth example of the method optionally includes any one or more or each of the first through third examples, and further includes wherein the engine torque command comprises a difference between the target crankshaft torque and a predetermined motor torque. A fifth example of the method optionally includes any one or more or each of the first through fourth examples, and further includes wherein commanding the motor torque in the second condition based on the prediction of the difference between the engine torque command and the maximum engine airflow torque capability further comprises obtaining a maximum value between the prediction of the difference between the engine torque command and the maximum engine airflow torque capability and a current difference between the engine torque command and the maximum engine airflow torque capability; and wherein the maximum value is used for commanding the motor torque in the second condition.

An example of a system for a hybrid vehicle comprises an engine; a motor/generator; and a controller with computer readable instructions stored on non-transitory memory that when executed cause the controller to: determine a motor torque command based on an engine torque command that is in turn based on a desired crankshaft torque; send the motor command to a model that outputs an expected delay between the motor torque command and an actual motor torque; adjust the engine torque command based on the expected delay; and subsequent to adjusting the engine torque command, control an engine actuator based on the adjusted engine torque command and command a motor torque based on the motor torque command. In a first example of the system, the system further includes wherein the engine is a diesel engine and where the controller stores further instructions to control the engine actuator to reduce an amount of fuel injected to the engine. A second example of the system optionally includes the first example, and further includes wherein the engine is a spark-ignition engine and where the controller stores further instructions to control the engine actuator to retard a timing of spark provided to the engine. A third example of the system optionally includes any one or more or each of the first and second examples, and further includes wherein the controller stores further instructions to determine an actual engine torque; filter the actual engine torque to remove engine torque oscillations to obtain a filtered actual engine torque; and add the filtered actual engine torque to the motor torque command.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A powertrain operating method, comprising:
   in a first condition, commanding a motor torque for a motor based on a difference between a target crankshaft torque and an engine torque command;
   in a second condition, commanding the motor torque based on a prediction of a difference between the engine torque command and a maximum engine airflow torque capability, including obtaining a maximum value between the prediction of the difference between the engine torque command and the maximum engine airflow torque capability and a current difference between the engine torque command and the maximum engine airflow torque capability, the maximum value used for commanding the motor torque in the second condition; and
   in both the first condition and the second condition, commanding an engine torque for an engine based on a motor torque response model that outputs a motor delay torque estimation that is added to the engine torque command to compensate for a motor delay.

2. The method of claim 1, wherein the first condition comprises the target crankshaft torque being below an ability of the engine to meet the target crankshaft torque; and wherein the second condition comprises the engine torque command being greater than the maximum engine airflow torque capability.

3. The method of claim 1, wherein commanding the engine torque further comprises retarding a spark provided to the engine.

4. The method of claim 1, wherein commanding the motor torque is not based on an actual engine torque.

5. The method of claim 1, wherein the engine torque command comprises a difference between the target crankshaft torque and a predetermined motor torque.

6. A system for a hybrid vehicle, comprising:
   an engine;
   a motor/generator; and
   a controller with computer readable instructions stored on non-transitory memory that when executed cause the controller to:
      in a first condition, command a motor torque for the motor/generator based on a difference between a target crankshaft torque and an engine torque command;

in a second condition, command the motor torque based on a prediction of a difference between the engine torque command and a maximum engine airflow torque capability, including obtaining a maximum value between the prediction of the difference between the engine torque command and the maximum engine airflow torque capability and a current difference between the engine torque command and the maximum engine airflow torque capability, the maximum value used for commanding the motor torque in the second condition; and in both the first condition and the second condition, command an engine torque for the engine based on a motor torque response model that outputs a motor delay torque estimation that is added to the engine torque command to compensate for a motor delay.

7. The system of claim 6, wherein the first condition comprises the target crankshaft torque being below an ability of the engine to meet the target crankshaft torque; and wherein the second condition comprises the engine torque command being greater than the maximum engine airflow torque capability.

8. The system of claim 6, wherein commanding the engine torque further comprises retarding a spark provided to the engine.

9. The system of claim 6, wherein commanding the motor torque is not based on an actual engine torque.

10. The system of claim 6, wherein the engine torque command comprises a difference between the target crankshaft torque and a predetermined motor torque.

* * * * *